(12) United States Patent
Gresse

(10) Patent No.: US 9,822,554 B2
(45) Date of Patent: Nov. 21, 2017

(54) SECURE BUTTON WITH INDICATOR

(71) Applicant: EURO-LOCKS S.A., Bastogne (BE)

(72) Inventor: Michel Gresse, Bastogne (BE)

(73) Assignee: EURO-LOCKS S.A., Bastogne (BE)

( * ) Notice: Subject to any disclaimer, the term of this patent is extended or adjusted under 35 U.S.C. 154(b) by 467 days.

(21) Appl. No.: 14/086,786

(22) Filed: Nov. 21, 2013

(65) Prior Publication Data

US 2014/0137612 A1    May 22, 2014

(30) Foreign Application Priority Data

Nov. 21, 2012   (BE) .................................. 2012/0783

(51) Int. Cl.
| | | |
|---|---|---|
| *E05B 41/00* | (2006.01) | |
| *F16B 39/00* | (2006.01) | |
| *E05B 65/00* | (2006.01) | |
| *F16B 31/02* | (2006.01) | |
| *F16B 37/14* | (2006.01) | |
| *F16B 41/00* | (2006.01) | |

(52) U.S. Cl.
CPC .......... *E05B 65/006* (2013.01); *F16B 31/027* (2013.01); *F16B 37/14* (2013.01); *F16B 41/005* (2013.01); *Y10T 70/554* (2015.04); *Y10T 70/5646* (2015.04); *Y10T 70/8459* (2015.04)

(58) Field of Classification Search
CPC ........ E05B 41/00; E05B 65/006; E05B 17/10; E05B 17/12; E05B 2047/0069; F16B 31/027; F16B 41/005; F16B 37/14; Y10S 70/57; Y10S 70/59; Y10T 70/8459; Y10T 70/554; Y10T 70/5646; Y10T 70/5854; Y10T 70/5858; Y10T 70/5863; Y10T 70/5867; Y10T 70/8027
USPC ............. 70/229–232, 432, DIG. 57, DIG. 59
See application file for complete search history.

(56) References Cited

U.S. PATENT DOCUMENTS

| | | | | |
|---|---|---|---|---|
| 3,535,898 A | * | 10/1970 | Allport ................. | F16B 41/005 411/910 |
| 4,441,344 A | * | 4/1984 | Kurpershoek .......... | B60R 9/058 70/221 |

(Continued)

FOREIGN PATENT DOCUMENTS

| BE | 1018687 A3 | 6/2011 |
|---|---|---|
| BE | 1019637 A5 | 9/2012 |

(Continued)

OTHER PUBLICATIONS

Search report dated Jul. 30, 2013, from corresponding Belgian application No. BE 2012/0783 filed Nov. 21, 2012 (7 pages).

*Primary Examiner* — Lloyd Gall
(74) *Attorney, Agent, or Firm* — Hovey Williams LLP

(57) ABSTRACT

Button comprising a nut (1), a support (3) and a cover (5) fitted on the aforesaid support (3) defining a chamber (6) and having at least one window (51, 52) for an indicator for at least one position chosen from a first position for the button roughly corresponding to a minimum tightening torque for the nut (1) and a second position for the button corresponding to a lower tightening torque than the tightening torque for the first position, with the aforesaid indicator (30) being connected to a plate (13) by a tube element (131) which ensures that a rotation of the plate (13) is translated into a rotation of the indicator (30).

37 Claims, 33 Drawing Sheets

(56) References Cited

U.S. PATENT DOCUMENTS

| | | | | |
|---|---|---|---|---|
| 4,559,796 A * | 12/1985 | De Forrest, Sr. | ....... | E05B 41/00 |
| | | | | 70/432 |
| 4,754,628 A * | 7/1988 | Siegel | ................... | F16B 41/005 |
| | | | | 70/230 |
| 4,848,112 A * | 7/1989 | Graber | ................. | F16B 41/005 |
| | | | | 224/315 |
| 5,074,134 A * | 12/1991 | Wheadon | .............. | E05B 13/101 |
| | | | | 137/384.2 |
| 5,214,945 A * | 6/1993 | Martin | ................. | B62D 53/085 |
| | | | | 70/167 |
| 6,070,442 A * | 6/2000 | Neeley | ................. | E05B 13/001 |
| | | | | 70/175 |
| 2003/0019258 A1* | 1/2003 | Irgens | ...................... | B60D 1/06 |
| | | | | 70/231 |
| 2004/0187533 A1* | 9/2004 | Huang | ................... | E05B 41/00 |
| | | | | 70/432 |
| 2007/0131002 A1* | 6/2007 | Frantz | ................ | B60R 11/0235 |
| | | | | 70/58 |
| 2008/0000277 A1* | 1/2008 | Yu | ........................... | E05B 29/00 |
| | | | | 70/432 |
| 2008/0112773 A1* | 5/2008 | Wang | ................... | F16B 41/005 |
| | | | | 411/372.5 |

FOREIGN PATENT DOCUMENTS

| | | | |
|---|---|---|---|
| WO | 2005/035924 | A1 | 4/2005 |
| WO | 2010/088971 | A1 | 12/2010 |
| WO | 2014/096327 | A2 | 6/2014 |
| WO | 2015/028161 | A1 | 3/2015 |

\* cited by examiner

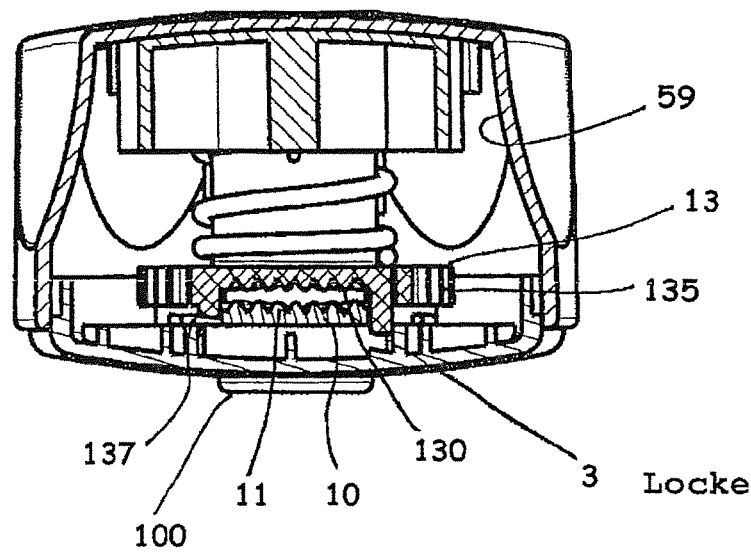
Fig 12 Locked Position
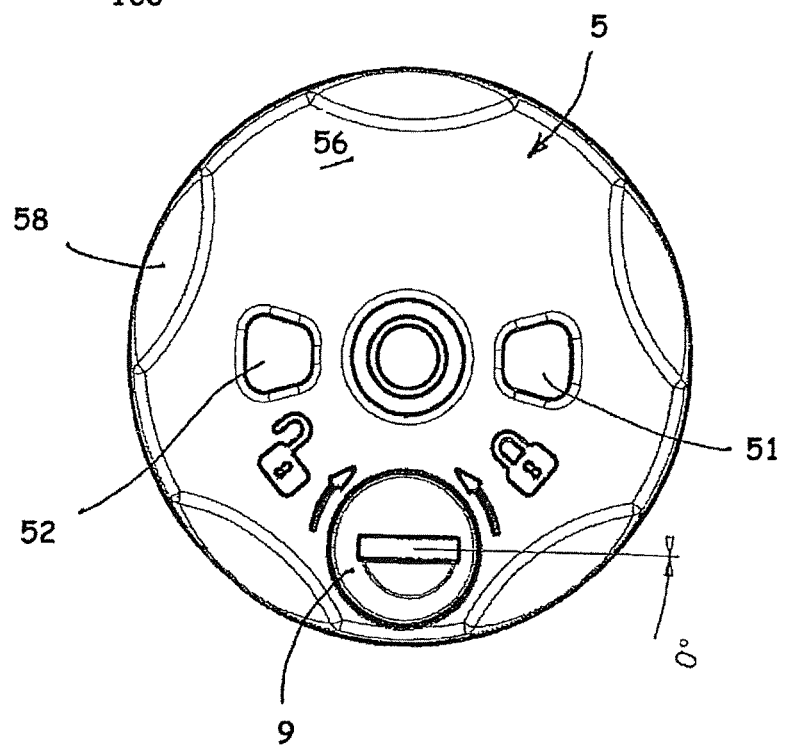
Fig 13

Unlocked Position

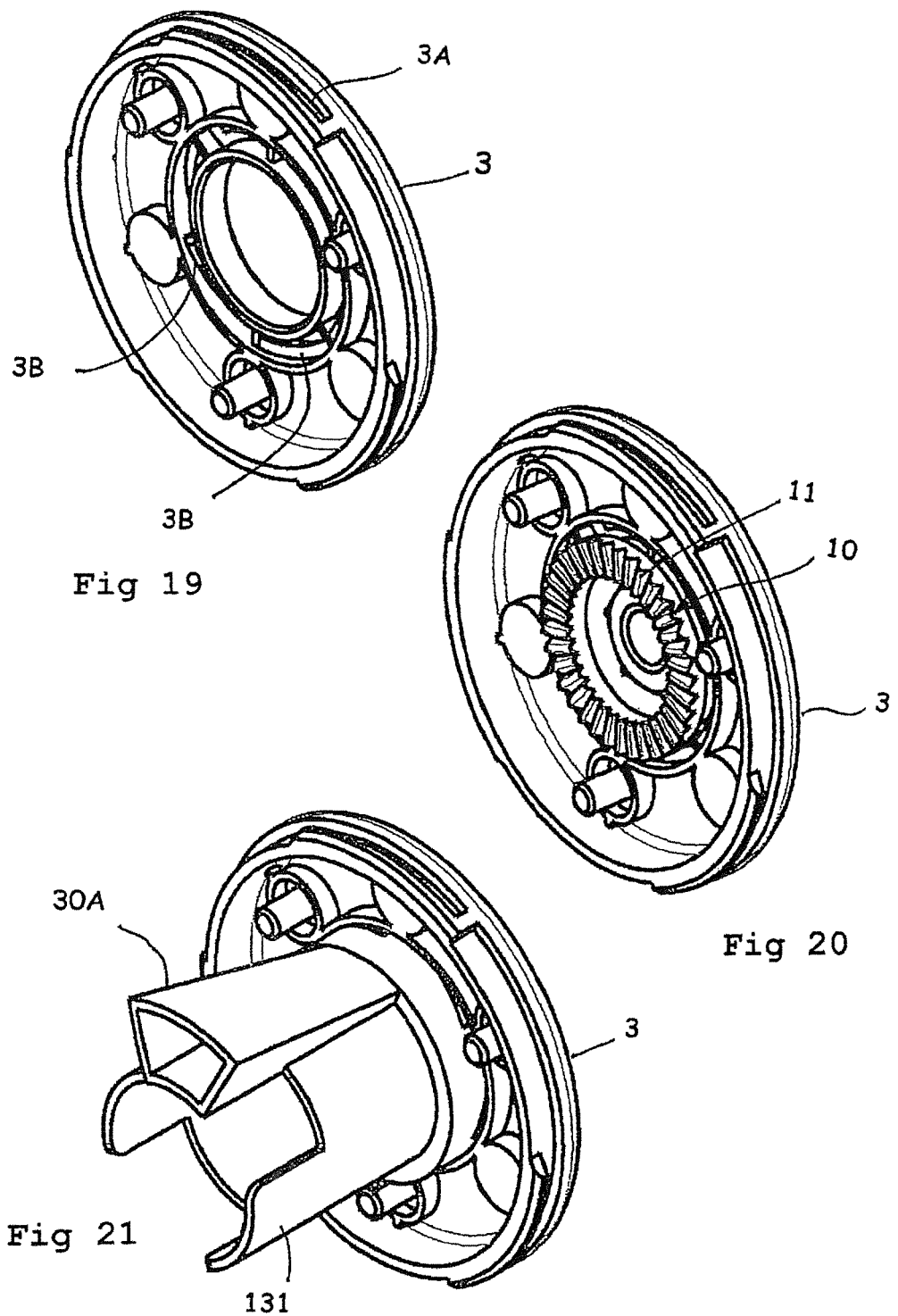

Locked Position

Unlocked Position

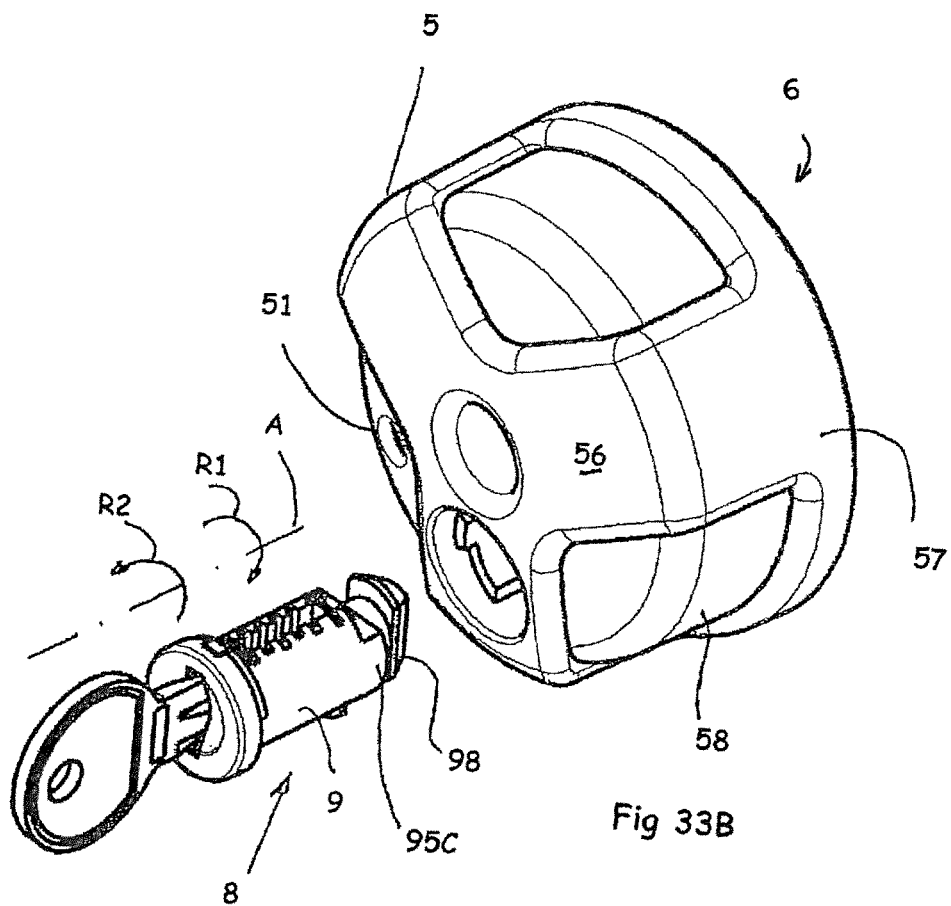

SECURE BUTTON WITH INDICATOR

CROSS-REFERENCE TO RELATED APPLICATIONS

The present application claims the priority benefit of Belgian Application No. 2012/0783, filed Nov. 21, 2012, and incorporated by reference herein in its entirety.

FIELD

This invention has as its subject a button linked with an element chosen from:
- a nut adapted to be fastened by rotation on a threaded rod, preferably a bolt by exerting a given minimal tightening torque, and
- a threaded rod, preferably a bolt, adapted to be fastened by rotation onto a nut by exerting a given minimal tightening torque, with the aforesaid rotation of the element being effected in relation to an axis of rotation corresponding either to the threaded rod's longitudinal axis or to the nut's central axis, with the aforesaid rotation acting in a first direction, favourably clockwise, to fasten the element onto the corresponding threaded rod or nut, and in a second direction, favourably anti-clockwise, opposed to the said first direction.

THE STATE OF THE ART

Buttons linked with a nut adapted to be fixed onto a threaded rod by screwing are known. This known button comprises:
- a support having an opening for the threaded rod onto which the nut must be screwed,
- a cover fitted onto the aforesaid support and defining a chamber with the aforesaid support,
- a mechanism linked to the aforesaid nut, with the aforesaid mechanism being situated in the aforesaid chamber and being fitted to move in the aforesaid chamber, and
- a locking mechanism comprising a rotor controlled by a key, with the aforesaid rotor being able to move between an open position in which a link is formed between the mechanism on the one hand and, on the other, the cover or support to enable the conversion of a rotation movement from the cover or support into a rotation movement of the nut in relation to the threaded rod in the fastening direction of the aforesaid nut onto the aforesaid threaded rod or in the unfastening direction of the nut in relation to the threaded rod, and a closed position in which the rotation of the support or cover does not involve the rotation of the element fastened onto the aforesaid nut or corresponding threaded rod.

Although this known button has several advantages for securing objects, practical use has nevertheless shown that this button had certain drawbacks, including
a) it was possible to lock the button when the nut was not threaded onto the rod enough. In such an instance it was sometimes possible to unscrew the nut with the button in the locked position (position in which the button does not enable the nut to be screwed onto the threaded rod).
b) If a too great tightening torque is applied when screwing the nut onto the threaded rod, it happened the button or a part thereof became damaged, which then made any subsequent unscrewing impossible.
c) it happened that users forgot to lock the button, thus forgetting to lock one object or the other.

An improved secure button is described in Belgian patent BE 1018687 (application BE2009/0154 of 16 Mar. 2009).

One problem with locked buttons is being able to display whether the button is properly fixed before it is locked. Another problem for locked buttons is being able to lock the means which enables display of the button's proper fixing before its locking.

The invention has as its subject a button enabling the two problems mentioned above to be resolved.

BRIEF DESCRIPTION OF THE INVENTION

The secure button in accordance with the invention is a button linked to an element (1) chosen from:
- a nut adapted to be fastened by rotation onto a threaded rod (2), preferably a bolt, by exerting a given minimum tightening torque, and
- a threaded rod, preferably a bolt, adapted to be fastened onto a nut by rotation by exerting a given minimum tightening torque (Cm), with the aforesaid rotation of the element (1) being effected in relation to an axis of rotation (A) corresponding either to the longitudinal axis of the threaded rod or to the central axis of the nut, with the aforesaid rotation acting in a first direction (R1), favourably clockwise, to fasten the element onto the corresponding threaded rod or nut, and in a second direction (R2), favourably anti-clockwise, opposed to the aforesaid first direction (R1) to withdraw the element from its fixing position, with the element (1) being favourably fitted onto a mounting part which facilitates the rotation of the element (1) in relation to the support (3).

The aforesaid button comprises:
- a support (3) having an opening (4) either for the threaded rod (2) adapted to be fastened by rotation onto the element (1) in the shape of the nut or for the element (1) in the form of the threaded rod adapted to be fastened by rotation onto the nut, with the element (1) being fitted into the aforesaid opening so as to enable its turning in rotation around the aforesaid axis of rotation (A);
- a cover (5) fitted on the aforesaid support (3) and defining a chamber (6) with the aforesaid support,
- a plate (13) linked or capable of being linked to the aforesaid element (1), with the aforesaid plate being situated in the aforesaid chamber and being fitted so as to move in the aforesaid chamber,
- a locking mechanism (8) comprising a rotor (9) controlled by a key and moving between an open position in which a link is formed between plate (13) on the one hand and, on the other, the cover (5) or support (3) to enable at least the conversion of a rotation movement from the cover or support into a rotation movement of the element (1) in relation to the threaded rod (2) or corresponding nut in the unfastening direction (R2) of the aforesaid element (1) to the aforesaid threaded rod or corresponding nut, and a closed position in which the rotation of the support (3) or cover (5) does not involve the rotation of the element (1) fastened to the aforesaid nut or corresponding threaded rod (2), at least when the tightening torque of the element (1) is greater than the minimum tightening torque, and
- a means of connection between the aforesaid plate (13) and the aforesaid element (1), with the aforesaid means of connection being at least adapted (a) to ensure that a rotation of the support (3) and the plate (13) in the first direction (R1) involves a rotation of the element (1) when the tightening torque of the element (1) is markedly lower than the minimum tightening torque (advantageously even if the rotor (9) is in the closed position), (b) to ensure, when the tightening torque for the element (1) is at least roughly equal to the minimum tightening torque, that a rotation of the support (3) and the plate (13) in the first direction (R1) does not involve rotation of the element (1), and (c) to ensure that in the closed position of the rotor (9) of the locking mechanism (8), a rotation of the support (3) and the plate (13) in the second direction (R2) does not involve rotation of the plate (13), at least when the tightening torque for the element is at least roughly equal to the aforesaid minimum tightening torque.

The button in accordance with the invention is characterised in that the cover (5) has at least one window for an indicator for at least one position chosen from a first position for the button roughly corresponding to the minimum tightening torque for the element (1) and a second position for the button corresponding to a lower tightening torque than the tightening torque of the first position, in that the indicator is connected to the plate (13) by a means which ensures that a rotation of the plate is translated into a rotation of the indicator, and in that the cover (5) comprises a means which limits the rotation of the indicator and thus of the plate.

According to one advantageous embodiment, the cover (5) comprises one or more interior walls forming a housing adapted to accommodate the rotor (9), with one or more walls forming the aforesaid housing or a wall part of the rotor forming the means of limiting the rotation of the indicator and thus of the plate (13).

Advantageous embodiments of a button in accordance with the invention comprise one or several of the following distinctive features:

the indicator is connected to the plate (13) by a suitable means to enable a translation movement parallel to the aforesaid axis of rotation (A) between at least one part of the indicator and the aforesaid plate (13), whilst a means extends between the aforesaid part of the indicator and the aforesaid plate (13) to exert a force which tends to move the aforesaid part of the indicator away from the aforesaid plate (13).

Such a means enables for example a contact stress to be exerted from the plate (13) upon the element (1) or a support part of the element (1), with this stress then enabling the minimum tightening torque for the element (1) to be ensured, and/or the cover (5) is attached to the support (3) by connection systems comprising one or more lugs joined to the cover and/or the support adapted to be housed in one or more housings which the support and/or the cover has, whereas the means exerting a force tending to move the aforesaid part of the indicator in relation to the aforesaid plate likewise exerts a force which tends to increase the latching of the cover onto the support (3). This enables to obtain a better friction-type connection of the cover onto the support (3) and thus an optimum protection for the indicator, and/or the plate (13) is fitted to move on the support (3) so as to be able to move parallel to the axis of rotation (A) between a position where the plate is brought closer to the element and a position where the plate is moved away from the element (1). This movement is effected favourably against the action of an elastic means, in particular by a spring, and/or the means exerting a force is an elastic means, in particular a spring, and/or the plate supports a tube or a rod (i.e. elongated means) having one or more means of guidance, whilst the indicator comprises a part capable of sliding into and/or around the tube or rod supported by the plate, with the aforesaid part of the indicator comprising at least one protuberance or one recess working together with a means of guidance for the tube or rod supported by the plate. Favourably, the guidance means acts to ensure the conversion of a rotation movement of the plate (13) into a rotation movement of the indicator, and/or an elastic means or a spring extends between the plate and the indicator to exert a force which tends to move the indicator away from plate (13). and/or on its outside face the cover has at least three outer lateral recesses defining the interlocking or gripping areas for one or more fingers of a user's hand. The aforesaid outer lateral recesses define on the inner side of the interior chamber (6) the guidance zones for one face of the indicator during its rotation. The indicator favourably has a perceptibly cylindrical external face on an angle of more than 180°, preferably of more than 230°, and/or the cover (5) has a front wall and a side wall adapted to cling to the support (3), with the front wall having along its internal face turned towards the chamber (6) a means of guidance fitted to work together with a rod or a cavity or orifice which has one part of the indicator, with the aforesaid rod or cavity or orifice having a central axis corresponding to the axis of rotation (A) of the plate (13), with the aforesaid means of guidance guiding the part of the indicator during its rotation. This enables the formation of a sort of rotation shaft for the plate (13), with the aforesaid shaft extending from the plate (13) up to the front wall of the cover (5), with such a shaft then acting as the means for enabling pivoting of the plate (13) to be limited, and/or the plate has a side wall equipped with teeth, whereas the rotor (9) comprises a part with one or more teeth fitted to work together with the teeth of the plate in the rotor's open position, with the aforesaid part being adapted so as not to act on the plate in the closed position of the rotor (9) so as to enable a relative rotation of the plate in relation to the element (1). The plate is favourably circular with teeth around its full perimeter, with this facilitating the positioning of the plate (13) and ensuring that the plate has a centre of gravity situated along the axis of rotation (A), and/or the cover (5) has at least one, favourably two windows for the indicator to indicate at least a first position for the button roughly corresponding to the minimum tightening torque for the element (1) and a second position for the button corresponding to a lower tightening torque than the first position's tightening torque. As regards the tightening torque, this enables both indication that it is not sufficient for the element (1) and hence ensuring a fixing of the button that does not enable a movement of the element (1) after the locking of the rotor, and at the same time as regards the button, that it must be turned again to ensure a proper fixing of the element (1) not enabling a movement of the element (1) after the locking of the rotor, and/or the rotor (9) is fitted so as not to be removed from the cover (5), and/or the support (3) and the plate (13) are equipped with suitable means to transform a rotation movement between the plate (13) and the support (3) into a translation movement of the plate (13) between (a) a first position for which a part supporting the element (1) is in contact with one face of the plate (13), and (b) a second position for which the part supporting the element (1) is separated from the plate (13) in such a manner that a rotation of the plate (13) does not lead to a rotation of the part supporting the element (1). Advantageously the rotor (9) has one end with teeth working together with the teeth of the plate (13) so that a rotation of the rotor (9) causes a rotation of the plate (13), and thus its movement in parallel to the axis of rotation (A), and/or the button is linked to a system indicating the position of the rotor (9), for example its locked or unlocked position.

The invention still has as its subject a button linked to an element (1), in which the element (1) is chosen from:

a nut (1) adapted to be fastened by rotation onto a threaded rod (2), preferably a bolt, by exerting a tightening torque, in particular a given minimum tightening torque, and a threaded rod, preferably a bolt, adapted to be fastened by rotation onto a nut, by exerting a tightening torque, in particular a given minimum tightening torque (Cm), with the aforesaid rotation of the element (1) being effected in relation to an axis of rotation (A) corresponding either to the threaded rod's longitudinal axis (A) or to the nut's central axis, with the aforesaid rotation acting in a first direction (R1), favourably clockwise, to fasten the element onto the corresponding threaded rod or nut and in a second direction (R2), favourably anti-clockwise, opposed to the aforesaid first direction (R1) to withdraw the element from its fixing position, with the aforesaid button comprising:

a support (3) having an opening (4) either for the threaded rod (2) adapted to be fastened by rotation onto the element in the form of a nut (1) or for the element (1) in the form of a threaded rod adapted to be fastened by rotation in the nut, with the element (1) being fitted into the aforesaid opening so as to be able to turn it in rotation around the aforesaid axis of rotation (A);

a cover (5) fitted on the aforesaid support (3) and defining chamber (6) with the aforesaid support, a plate (13) linked to or capable of being linked to the aforesaid element (1), with the aforesaid plate being situated in the aforesaid chamber and being fitted to move in the aforesaid chamber, a locking mechanism (8) comprising a rotor (9) controlled by a key (15) and able to move between an open (or unlocked~FIG. 44) position in which a link is formed between the plate (13) on the one hand and, on the other, the cover (5) or support (3) to enable at least the conversion of a rotation movement of the cover or support into a rotation movement of the element (1) in relation to the corresponding threaded rod (2) or nut in the unfastening direction (R2) of the aforesaid element (1) to the aforesaid corresponding threaded rod or nut, and a closed (or locked~FIG. 40) position in which the rotation of the support or cover does not involve the rotation of the element (1) fastened to the aforesaid corresponding nut or threaded rod (2), at least when the tightening torque for the element (1) is greater than the aforesaid minimum tightening torque, and a means of connection (95C) between the aforesaid plate (13) and the aforesaid element (1), with the aforesaid means of connection being fitted to move in relation to cover or support (3) between a first position adjusted to ensure that a rotation of the support (3) and cover (5) ensures a rotation of the plate (13) at least in the second direction (R2), preferably in the first and second directions (R1, R2), and a second position adjusted to ensure that a rotation of the support (3) and the cover (5) does not involve a rotation of the plate (13) at least in the second direction (R2), preferably in the first and second directions (R1, R2), characterised in that the rotor (9) of the locking mechanism (8) is fitted to control the movement of the means of connection (95C) between its first position and its second position and conversely, in that the cover (5) has at least one window (51, 52) for an indicator (30) for at least one position chosen from the first position of the means of connection (95C) and the second position of the means of connection (95C), and in that the indicator (30) is connected to the plate (13) by a part (9) attached to the means of connection (95C).

Advantageously the means of connection (95C) is an end part of the rotor (9) for the means of locking (8), with the aforesaid end part (95C) being fitted so that in a first position the end part 95C is moved away from the plate (13) (not extending in the cavity between two teeth 139E) and so that the aforesaid end part (95C) acts on the aforesaid plate (13) in a second position (extending within a cavity between two teeth 139E).

In the first position, the plate is favourably free to turn in the first direction and the second direction, whilst in its second position, the plate 13 is capable of being driven in rotation by the rotation of the cover 5.

The cover 5 favourably has a guide, preferably a central guide 60, extending into the chamber 6. The indicator 30 is linked to a part 39 fitted to rotate in relation to guide 60 of the cover 5. The axis of rotation of the part 39 is favourably parallel to the axis of rotation of the end part 95C of the rotor 9. The axis of rotation of the part 39 is preferably the button's axis A-A of rotation. The axes of rotation of the rotor and of the button are preferably apart from each other.

The part 39 is favourably fitted to work together with an element 96 fitted around at least one part of the rotor. This element 96 has grooves or slots 96A, 96B fitted to accommodate one or more ends of the eyelet structures of the rotor 9 to enable a rotation of the element 96 following a rotation of the rotor 9. The element 96 bears an arm 97 fitted to work together with an arm 39A of the part 39, so that a rotation movement of the element 96 around the axis of rotation of the rotor 9 generates a rotation movement of the part 39 around an axis apart from the axis of rotation of the rotor 9, favourably the button's axis of rotation A-A.

The means of working together between the arms 97, 39A is favourably a cam (for example 97A) borne by one of the arms (for example 97) and capable of sliding in a groove or window (for example 39B). The cam's movement is thus guided in the groove or window and enables a rotation movement of the element 96 to be converted into a rotation movement of the part 39. When the rotor is rotated towards its locked position or its unlocked position, one part of an arm 39A and/or 97 or the cam 97A is positioned behind the window 51 of the cover 5, so as to indicate the locked or unlocked position of the rotor 9 and thus of the button.

According to one advantageous embodiment, the arm 39A has an end 39E which has a circular profile whose centre corresponds to the axis of rotation of the part 39. This end 39E is favourably fitted to slide along an internal wall, with this internal wall having a surface which has a circular curve which has the axis of rotation of the part 39 as its centre of curvature. This internal wall is favourably a portion of the internal side wall of the cover 5.

Still in accordance with an advantageous detail of one embodiment, the plate 13 has a series of teeth 139E which between them define cavities fitted to accommodate the end part 95C in the unlocked position. In the unlocked position, the free ends of the teeth do not come into contact with the end part 95C, thus enabling a free rotation of the support and the cover 5 in relation to the plate 13 and bolt 1.

In accordance with another advantageous characteristic of one embodiment, the plate 13 is linked to a tube 12 fitted to extend at least partly into the opening 4 of the support 3. This tube 12 acts as a means of guidance for the rotation of the plate 13 in relation to the support 3. In the embodiment shown in FIG. 33, the tube has a cavity fitted to accommodate the bolt 1. The bolt is joined together with the tube. By way of advantage, the bolt 1 is inserted into the tube 12 in such a manner that the bolt is away from the free end of the tube turned towards the chamber 6.

In accordance with another detail of one preferred embodiment, the cover is linked to a central tube 60 extending into the chamber 6 from the cover 5. The end of this central tube (extending along the axis of rotation A of the cover 5 and the support 3) is fitted to extend partly into the cavity of the tube 12 attached to the plate 13. This enables movements in the axis A of the plate 13 in relation to support 3 to be limited or even avoided. This also enables additional guidance for the tube 12 to be provided during a relative rotation movement of the plate 13 in relation to the support 3.

In accordance with another advantageous detail of this preferred embodiment, the central tube 60 acts as a means for guiding the rotation of the part 39. For example, the part 39 has the form of a ring or part of a ring, for example split or with a portion removed, which is fitted on the central tube 60. The base of the ring may give support to the plate 13 so as to limit or avoid axial movements of the plate 13 in relation to the support 13.

The invention also has as its object a system for securing an object by at least screwing at least one element chosen from:
- a nut adapted to be fastened by rotation onto a threaded rod, preferably a bolt, by exerting a given minimum tightening torque, and
- a threaded rod, preferably a bolt, adapted to be fastened by rotation onto a nut by exerting a given minimum tightening torque, with the aforesaid rotation of element being effected in relation to an axis of rotation corresponding either to the threaded rod's longitudinal axis or the nut's central axis, with the aforesaid rotation acting in a first direction, favourably clockwise, to fasten the element onto the corresponding threaded rod or nut, and in a second direction, favourably anti-clockwise, opposed to the aforesaid first direction, in which at least one element is connected to any one of the buttons according to the invention, as described in this paper, particularly such as those claimed.

In particular, the object to be secured is one or more cycles placed on a cycle rack, a gate or a luggage rack, one or more skis placed on a ski rack or one or more vehicle wheels attached to a support.

The special features and details of the invention will become apparent from the following detailed description, in which reference is made to the attached drawings of preferential embodiments which are given solely by way of example.

BRIEF DESCRIPTION OF THE DRAWINGS

In these drawings,

FIG. 12 is a sectional view along the lines XII-XII of the button with the rotor in the locked position of FIG. 9;

FIG. 13 is a front view of the button in FIG. 1 with the rotor in the unlocked position;

FIG. 19 is a partial internal view of the button in FIG. 17;
FIG. 20 is a partial internal view of the button in FIG. 17;
FIG. 21 is a partial internal view of the button in FIG. 17.

FIG. 33B is an exploded view of components of the button of FIG. 33A;

In the drawings, same numerals and references designate similar elements.

DESCRIPTION OF PREFERRED EMBODIMENTS

Figure 1:
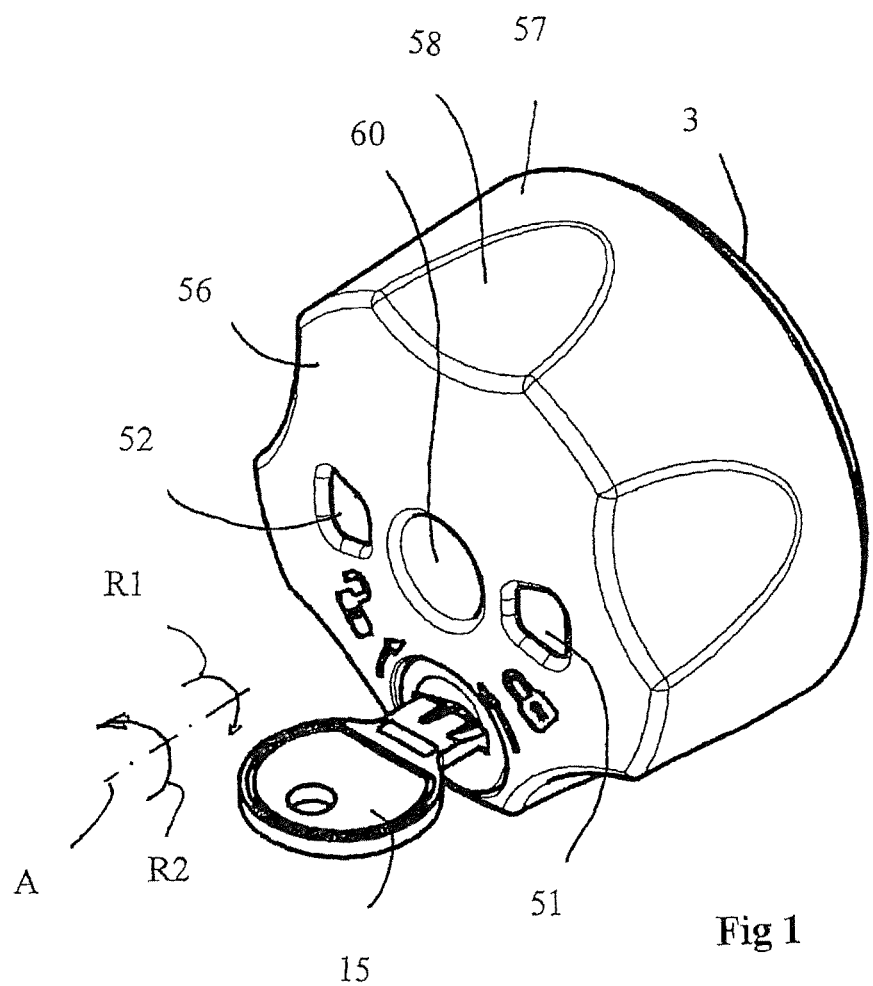
FIG. 1 is a perspective view of a secure button in accordance with the invention.

The secure button in FIG. 1 is linked to an element (1) which in this case is a nut (1) fastened onto a support element (10) having a circular plate 10A equipped with radial teeth 11 and a hollow protuberance 12 defining a housing 12A to accommodate the nut 1. The nut 1 is adapted to be screwed onto a threaded rod 2. In one variant the support element 10 could be joined together with a threaded rod adapted to be screwed onto a nut.

The nut or bolt 1 is adapted to be fixed onto a threaded rod (2) by rotation by exerting a given minimum tightening torque (Cm), with the aforesaid rotation of the element (1) being effected in relation to an axis of rotation (A) corresponding either to the longitudinal axis of the threaded rod (2) or to the central axis of the nut (1), with the aforesaid rotation acting in a first direction (R1), favourably clockwise, to fasten the element onto the threaded rod, and in a second direction (R2), favourably anti-clockwise, opposed to the aforesaid first direction (R1) to withdraw the element from its fastened position.

The aforesaid button comprises:
- a support (3) having an opening (4) for a threaded rod (2) adapted to be fastened by rotation onto the element in the shape of a nut (1), with this opening also acting as a means for positioning the protuberance 12 and therefore for the nut 1 during the rotation of the support element 10 in relation to support 3 around the aforesaid axis of rotation (A);
- a cover (5) fitted on the aforesaid support (3) and defining a chamber (6) with the aforesaid support (3),
- a plate (13) connected to or capable of being linked to the aforesaid element (1), with the aforesaid plate (13) being situated in the aforesaid chamber (6) and being fitted to move in the aforesaid chamber (6),
- a locking mechanism (8) comprising a rotor (9) controlled by a key (15) and moving between an open position in which a link is formed between on the one hand the plate (13) and, on the other, the cover (5) or support (3) to enable at least the conversion of a rotation movement of the cover or support into a rotation movement of the element (1) in relation to the threaded rod (2) in the unfastening direction (R2) of the aforesaid element (1) to the corresponding aforesaid threaded rod or nut and a closed position in which the rotation of the support or the cover does not involve the rotation of the element (1) fastened onto the corresponding aforesaid nut or threaded rod (2) at least when the tightening torque for the element (1) is greater than the aforesaid minimum tightening torque, and
- a means of connection 20 between the aforesaid plate (13) and the aforesaid element (1), with the aforesaid means of connection being adjusted at least (a) to ensure that a rotation of the support (3) and the plate (13) in the first direction (R1) drives a rotation of the element (1) when the tightening torque for the element (1) is perceptibly lower than the minimum tightening torque, (b) to ensure, when the tightening torque for the element (1) is at least roughly equal to the minimum tightening torque, that a rotation of the support (3) and the plate (13) in the first direction (R1) does not drive the rotation of the element (1), and (c) to ensure that in the closed position of the rotor (9) of the locking mechanism (8), a rotation of the support (3) and the plate (13) in the second direction (R2) does not involve rotation of the plate (13) at least when the tightening torque for the element is at least roughly equal to the aforesaid minimum tightening torque.

The cover (5) has at least one window 51, 52 for an indicator 30 for at least one position chosen from a first position for the button roughly corresponding to the minimum tightening torque for the element (1) and a second position for the button corresponding to a lower tightening torque than the tightening torque for the first position.

The indicator 30 is connected to the plate (13) by a means 40 which ensures that a rotation of the plate 13 is translated into a rotation of the indicator 30.

The cover (5) comprises a means which limits the rotation of the indicator 30 and thus of the plate 13.

The cover 5 comprises an internal wall 53 forming a housing adapted to accommodate the rotor (9), with the said wall 53 acting as a stop to limit the rotation of the indicator 30 and thus of the plate (13). The indicator 30 has curved end surfaces 30AE1 and 30AE2 adapted to hug the surface curve of the internal wall 53, either in the tightening torque position for the greater than the minimum tightening torque, or in the lower than the minimum tightening torque tightening torque position.

The indicator 30 is connected to the plate (13) by a means 40 fitted to enable a relative translation movement of the indicator 30 parallel to the aforesaid axis of rotation (A) of at least one part 31 of the indicator with respect to aforesaid plate (13). Furthermore, a spring 41 extends between aforesaid part 31 of the indicator 30 and aforesaid plate (13) to exert a force F 1 which tends to move the aforesaid part 31 of the indicator 30 away in relation to the aforesaid plate (13).

The cover 5 is attached to the support 3 by connection systems comprising one or more lugs joined to the cover 5 and/or support that is/are adapted to lodge in one or more of the openings or recesses (3A) which the support and/or the cover has. For example, the cover has lugs or cams adapted to click into the openings or recesses 3A of the support 3 on the side of the chamber 6. In fact, the spring 41 also exerts a stress which tends to move the cover 5 of the support away, with the stress thus increasing the friction-type connection or latching of the cover 5 with the support 3.

Figure 16:
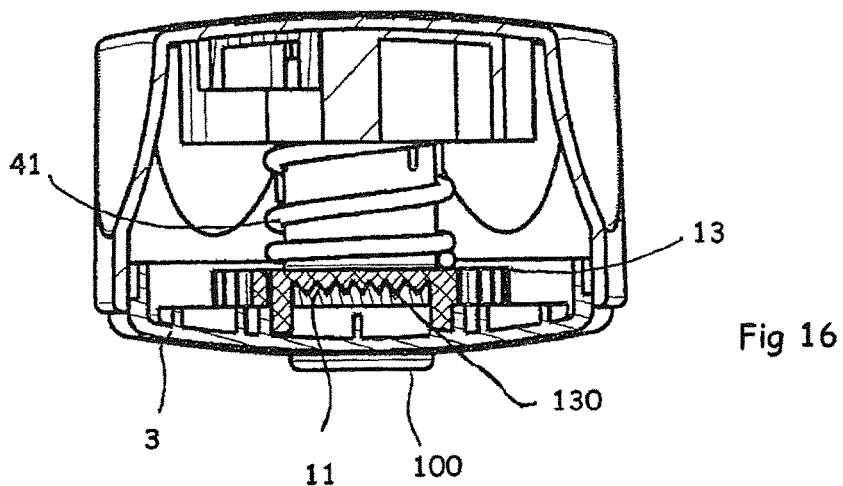
FIG. 16 is a sectional view along the lines XVI-XVI of the button with the rotor in the unlocked position of FIG. 13.

The plate (13) is fitted to move on the support (3) so as to be able to move in parallel to the axis of rotation (A) between one position where the plate is brought closer to the element (1) (position for which the teeth 11 of the support element 10 are in contact with the radial teeth 130 of the face 13A of the plate 13—see FIG. 16—rotor 9 in the unlocked position) and a position where the plate 13 is moved away from the element (1) (position for which the teeth 11 of the support element 10 are not in contact with the radial teeth 130 of the face 13A of the plate 13—see FIG. 12—rotor 9 in the locked position).

The movement of the plate 13 in relation to the element 1 is effected against the action of the spring 41. Thus when the tightening torque for the element 1 (in this instance the nut 1 onto the rod 2) is greater than the minimum tightening torque Cm, any additional tightening of the nut 1 onto the rod 2 involves a rotation movement of the plate 13 in relation to the support element 10, with the teeth 130 of the plate 13 sliding against the teeth 11 of the support element 10, leading to an axial movement (axis A) of the plate 13.

The plate 13 has a tube cavity 131 which has at its end away from the plate 13 slots 132 acting as a means of guidance, whereas the indicator 30 comprises a part 31 capable of sliding around the tube cavity 131 borne by the plate, with the aforesaid part of the indicator comprising protuberances 32 which each work together with a slit 132 in the tube 131. During an axial movement of the plate 13, the tube cavity 131 slides into the cylindrical part 31 (with the protuberances 32 being moved into the slots 132), whilst a rotation movement of the plate 13 gives rise to a rotation of the indicator 30 via the axial protuberances 32 housed in the axial slots 132.

The indicator 30 comprises a main part 30A of a first colour to indicate a tightening torque lower than the minimum tightening torque and a secondary part 30B of another colour to indicate a tightening torque greater than or close to the minimum tightening torque Cm. In the position for a tightening torque lower than the minimum tightening torque Cm, the diametrically opposed parts 30A1 and 30A2 of the face turned towards the windows 51, 52 of the cover 5 are visible through the windows 51, 52, whereas in the locked position for a torque greater or roughly equal to the minimum tightening torque, the diametrically opposed parts 30B1, 30B2 of the face turned towards the windows 51, 52 are visible. The parts 30A, 30B are adjusted for a rotation (in relation to the axis A) of the part 30A gives rise to a rotation (in relation to the axis A) of the part 30B.

In the locked position, the plate 13 is apart from the element 1. The rotor 9 undergoes a rotation for this locking. This rotor has at its free end a toothed wheel 90 fitted to mesh with the wheel-shaped plate 13. The plate 13 is fitted with teeth 135 on its side edge meshing with the teeth 91 of the toothed wheel 90. The teeth 91 and 135 each have faces parallel to the axis A and they are fitted to enable a relative axial movement of the teeth 135 in relation to the teeth 91 during an axial movement of the plate 13. Thus the rotor 9 has one free end 95 adjusted so as not to impede an axial movement of the plate 13 towards its position away from the element 1. In one particular embodiment, the free end 95 acts as a stop for the plate 13 in its locked position away from the element 1.

The rotor 9 is placed in a roughly cylindrical housing defined by the internal wall 53 of the cover 5. This rotor 9 comprises eyelet structures 92A, 92B fitted to move in the housings of the rotor 9 under the action of a key 15. The eyelet structure 92B acts as a means to keep the rotor 9 inside the housing. Such an eyelet structure is moved to the inside of the rotor 9 by a specific key to withdraw the rotor 9 to change it, for example. The rotor 9 is thus a rotor fitted to be immobile in relation to the cover 5. The other eyelet structures 92A are adapted to hold the rotor 9 in its locked position, with one part of the eyelet structures 92A coming out of rotor 9 to extend into the housings of the internal wall 53 so as to counteract the rotation of rotor 9. The rotor 9 is controlled by a key 15, with this key activating the eyelet structures 92A so they extend into the rotor and enable a rotation of the rotor 9.

Figure 9:
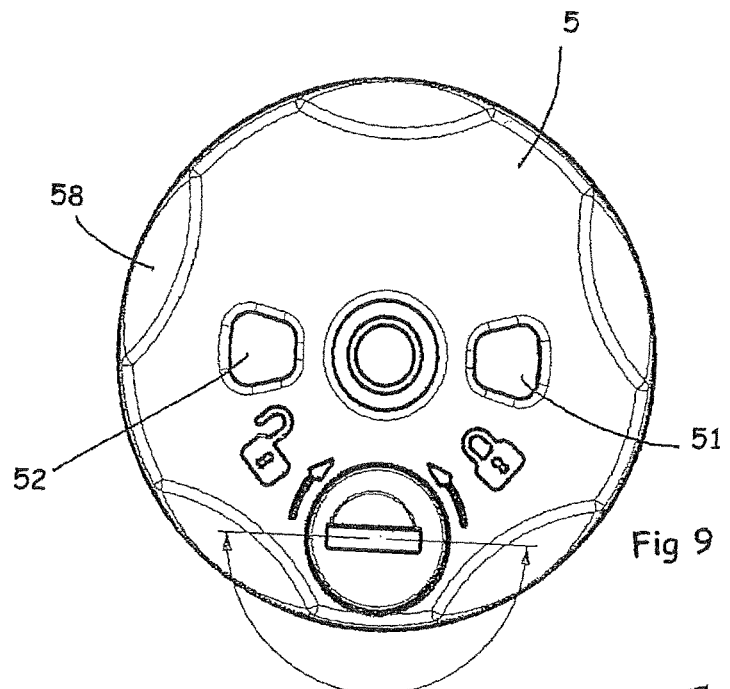
FIG. 9 is a front view of the button in FIG. 1 with the rotor in the locked position.

Turning the rotor 9 from its unlocked position (FIG. 13) to its locked position (FIG. 9) by the key 15 in anti-clockwise direction drives the wheel 91 in rotation, driving the wheel 13 in the clockwise direction R1. On its face 13A turned toward the element 1, the wheel 13 is equipped with protuberances 137 adapted to slide respectively on the helix pitch 3B of the support 3. The angle of the helix pitch or parts of the helix is such that in the unlocked position, the protuberances touch the parts of the helix furthest away from the plate 13, with the plate 13 and the support element 10 being capable of working with each other, and that in the locked position, the protuberances 137 are supported in the closest parts of the helix closest of the plate 13.

When the rotor 9 is in the unlocked position, a rotation of the cover 5 will enable the screwing of the nut 1 onto the rod 2. During this screwing (R1), the tightening torque for the nut onto the rod increases. When the tightening torque becomes greater than to a minimum given torque Cm (for example when the free end 100 of the support element 10 comes to rest against a wall bearing the rod 2) a rotation of the cover 5 in relation to the element 1 takes place in the direction R1. This additional rotation movement of the cover gives rise to a rotation (in the direction R1) of the plate 13 in relation to the support element 10 and thus on the one hand a rotation of the wheel 90 and of the rotor 9 in the anti-clockwise direction and, on the other, the sliding of the protuberances 137 on the helices 3B of the support 3 and thus an axial movement of the plate 13 against the action of the spring 41. The rotation of the rotor 9 will take place until the rotor is brought into its locked position, with the plate coming to reset against the face 95 (free end) of the rotor 9.

Figure 10:
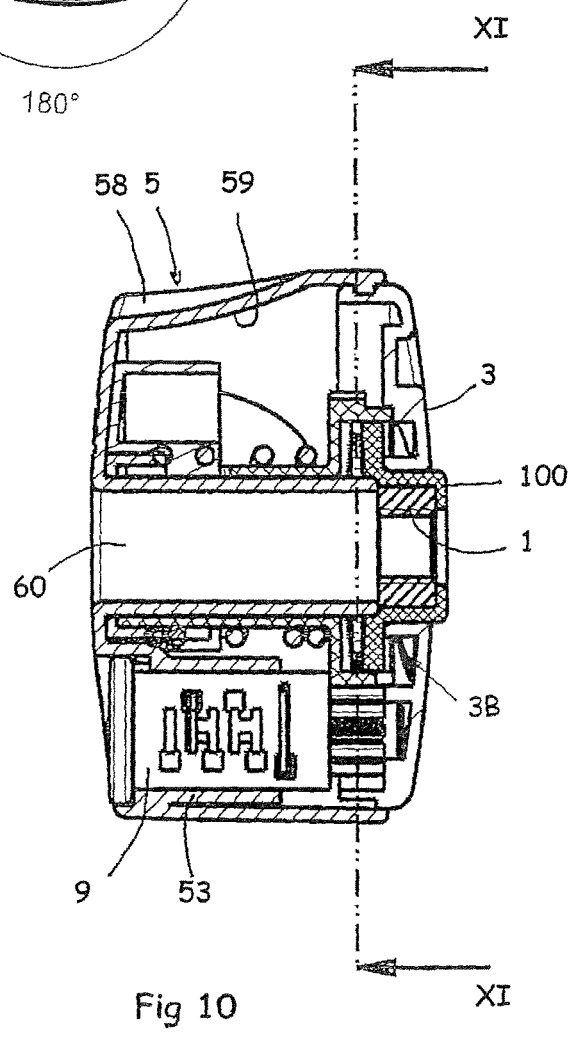
FIG. 10 is a sectional view along the lines X-X of the button with the rotor in the locked position of FIG. 9.
Figure 11:
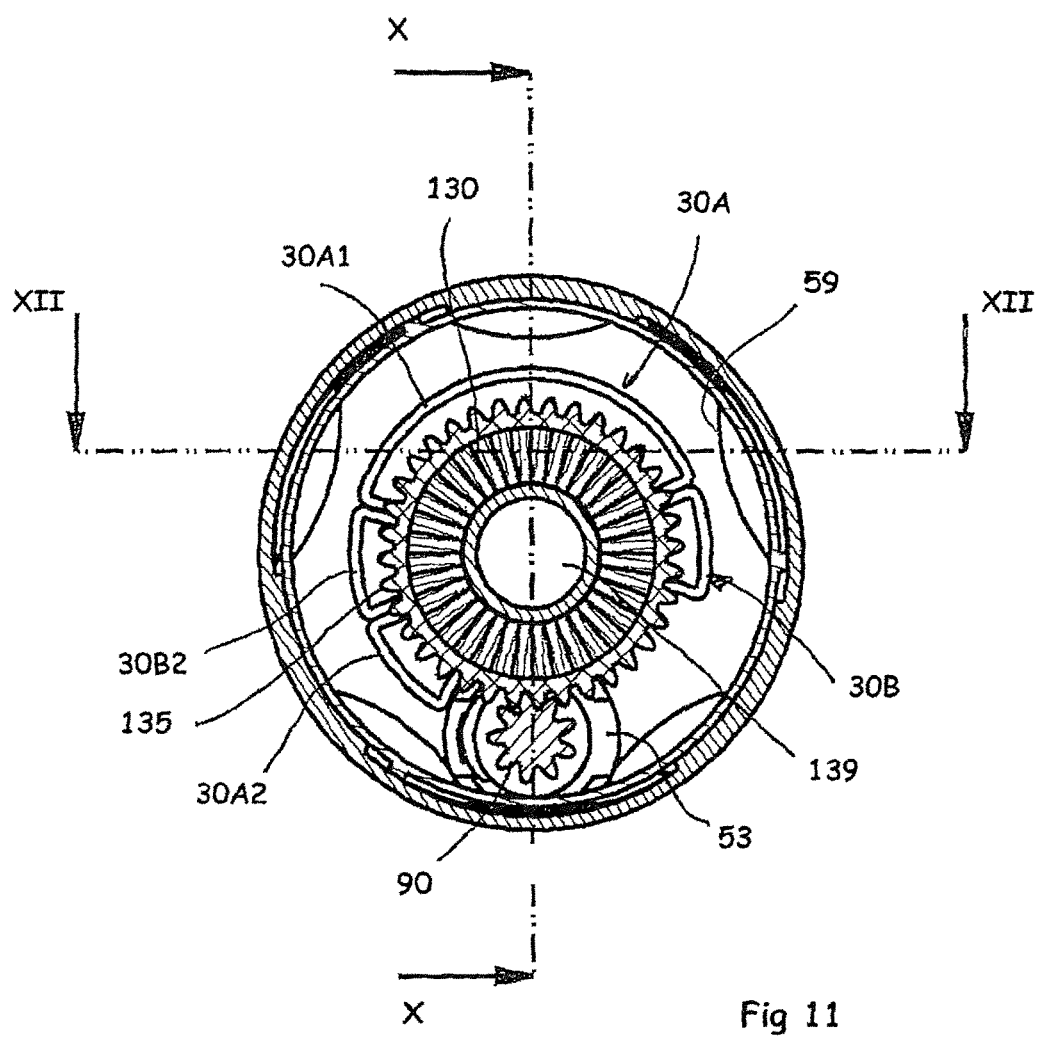
FIG. 11 is a sectional view along the lines XI-XI of the button with the rotor in the locked position of FIG. 9.
Figure 14:
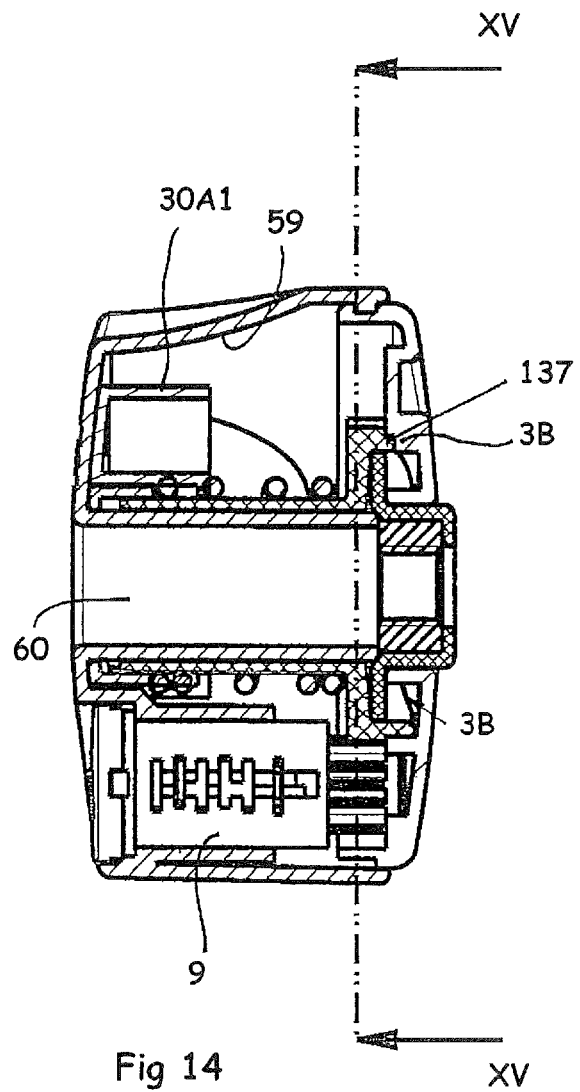
FIG. 14 is a sectional views along the lines XIV-XIV of the button with the rotor in the unlocked position of FIG. 13.
Figure 15:
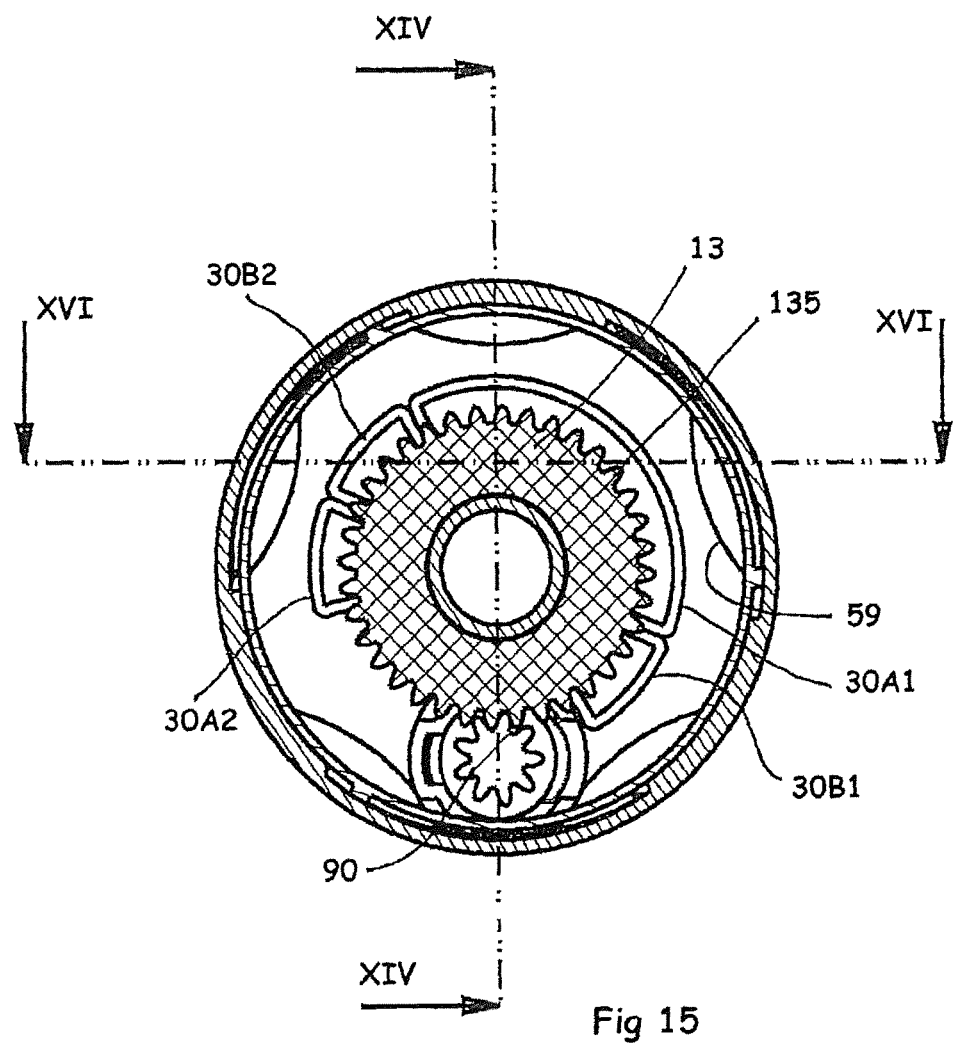
FIG. 15 is a sectional view along the lines XV-XV of the button with the rotor in the unlocked position of FIG. 13.

On its outside face the cover 5 has five lateral recesses 58 defining the interlocking zones for one or more fingers of a user's hand, with the aforesaid recesses 58 possibly defining guidance zones 59 (see FIGS. 10 to 12) for the side of the interior chamber (6) for one face of the indicator during its rotation if the external diameter of the indicator 30 corresponds roughly to the diameter of the interior circle defined between the guidance zones 59.

The cover (5) has a front wall 56 and a side wall 57 adapted to hold onto the support (3), with the front wall 56 having the length of its internal face turned towards the chamber (6), with a tube 60 acting as a means of guidance fitted to work together with a cavity or opening 30C which one part of the indicator 30 has, as well as with the cavity of the tube 131 borne by plate 13 and the central opening 139 (see FIG. 11) of the plate 13. This enables the correct alignment of the indicator 30 and plate 13 to be ensured, even during an axial movement of the plate. The free end of the tube 60 is favourably adapted to act as a stop for the nut or a smooth circular part of the support element 10 so as to limit any axial movement of the support element and to prevent the teeth of the support element 3 coming into contact with the teeth of the plate 13 in the locked position. After a screwing operation, the rod 2 can pass through the nut 1 to have its end extending into the central tube 60 of the cover 5. It is evident that other means could be used to limit an axial movement of the support element 10. For example, the support element 10 could be inserted into a housing of the support 3 by means of a clipping system enabling a rotation of the support element 10 in relation to support 3.

The tube 60 may be closed by a hood along the front face or wall 56 of the cover 5.

The invention also has as its object a system for securing an object by the screwing of at least one element chosen from:
  a nut adapted to be fastened by rotation onto a threaded rod, preferably a bolt, by exerting a given minimum tightening torque, and
  a threaded rod, preferably a bolt, adapted to be fastened by rotation onto a nut by exerting a given minimum tightening torque,
with the aforesaid rotation of the element being effected in relation to an axis of rotation corresponding either to the threaded rod's longitudinal axis or to the nut's central axis, with the aforesaid rotation acting in a first direction, favourably clockwise, to tighten the element onto the corresponding threaded rod or nut, and in a second direction, favourably anti-clockwise, opposed to the aforesaid first direction, in which at least one element is linked to a button according to the invention, for example of the type described in the figures.

The object to be secured is one or more cycles placed on a cycle rack, a gate or a luggage rack, one or more skis placed on a ski rack or one or more vehicle wheels attached to a support. The object to be secured could also be a wheel, for example a cycle wheel, etc.

Figure 2A:
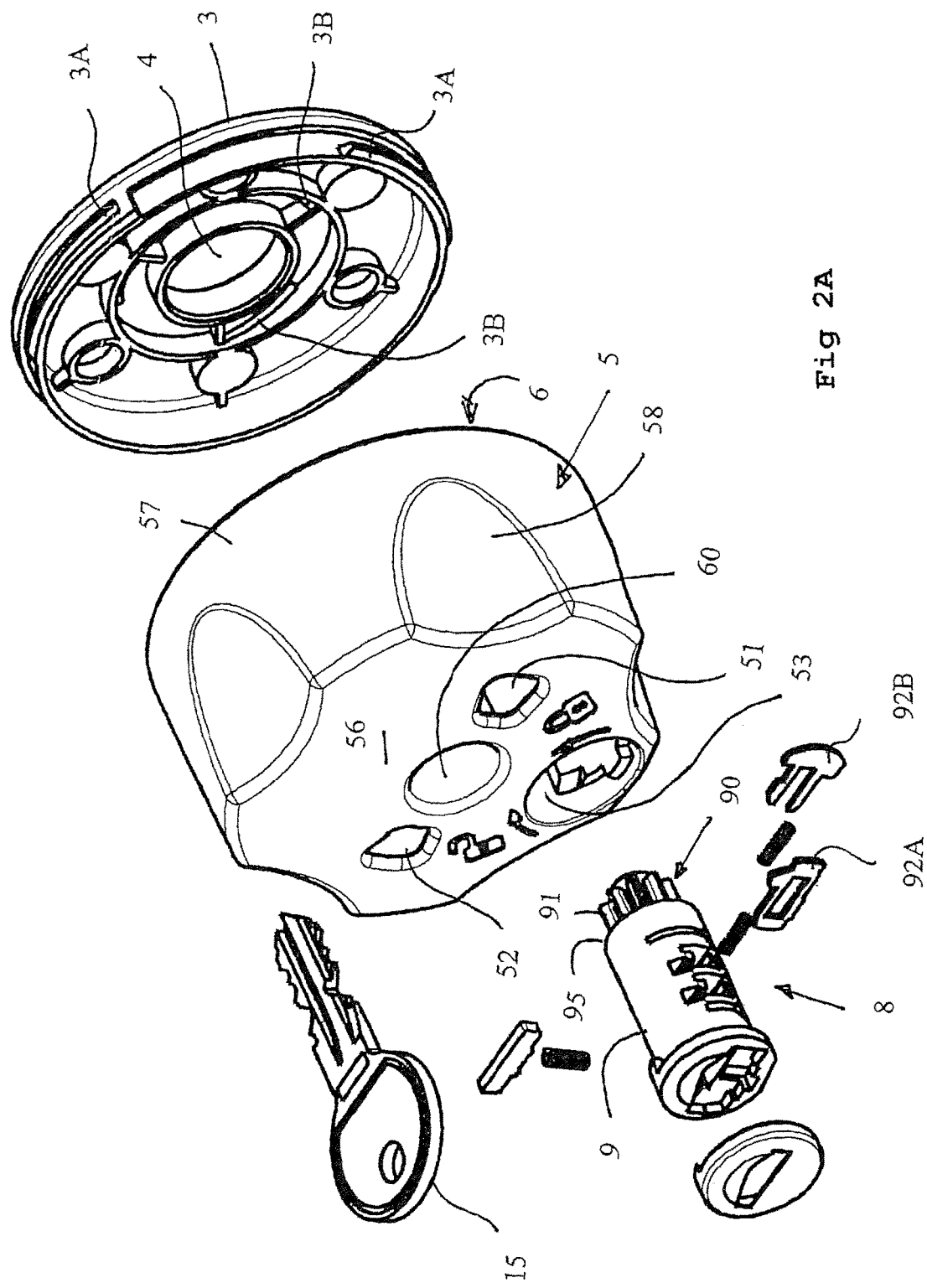
FIG. 2A is an exploded view of components of the secure button of FIG. 1.
Figure 2B:
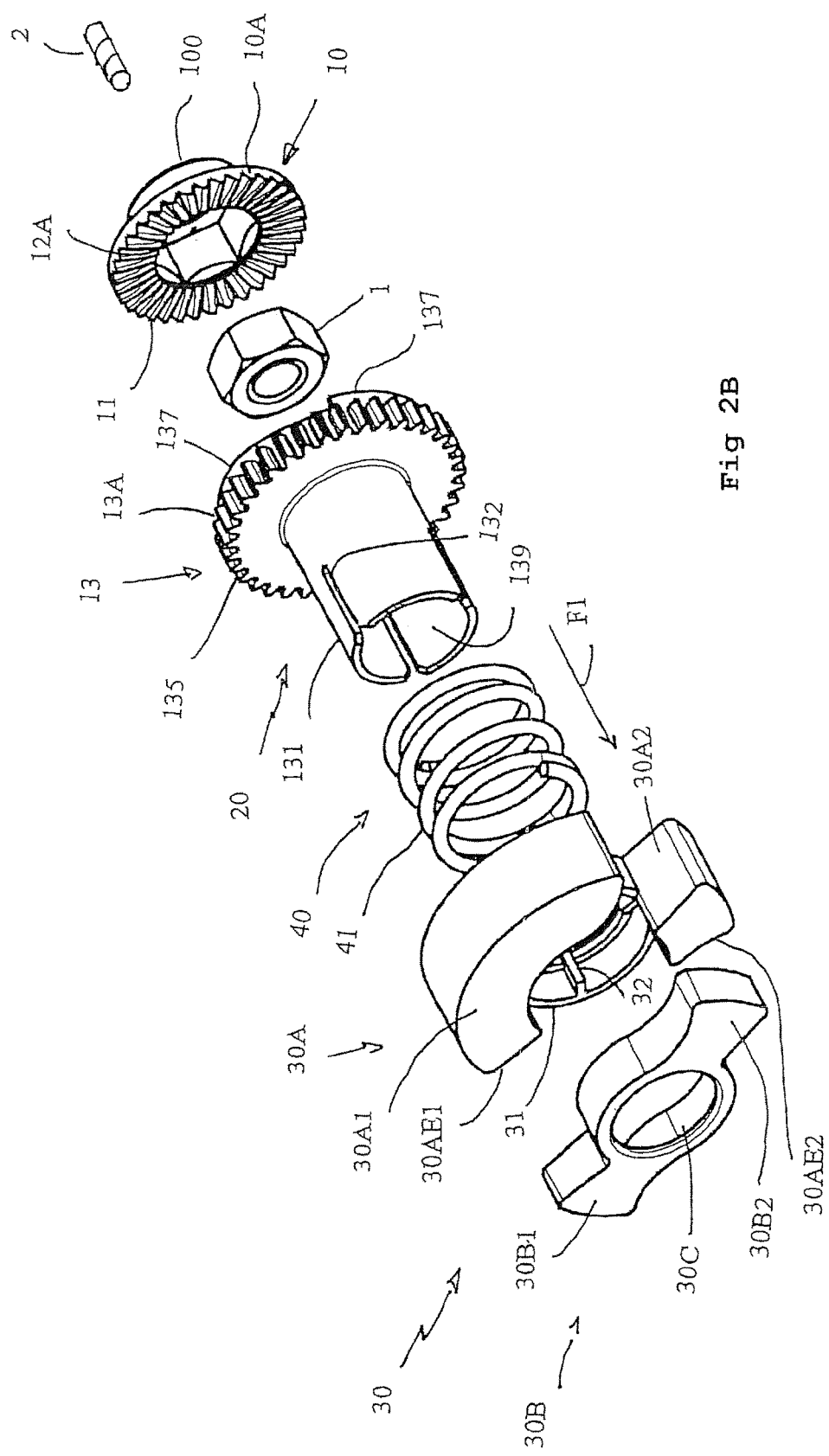
FIG. 2B is an exploded view of components of the secure button of FIG. 1.
Figure 3:
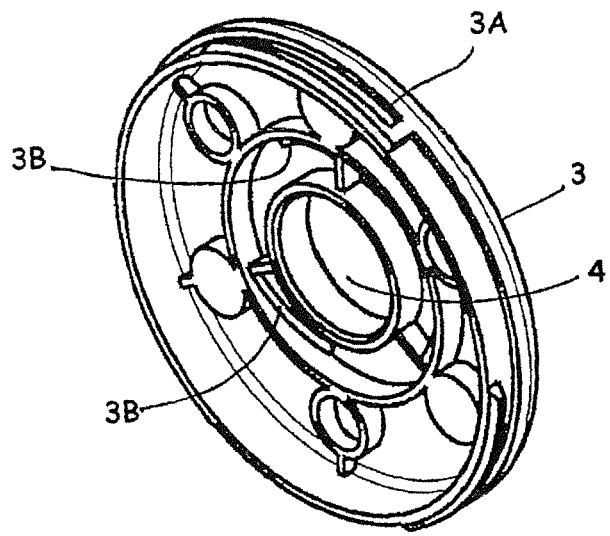
FIG. 3 is a partial internal view of the secure button in FIG. 1.
Figure 4:
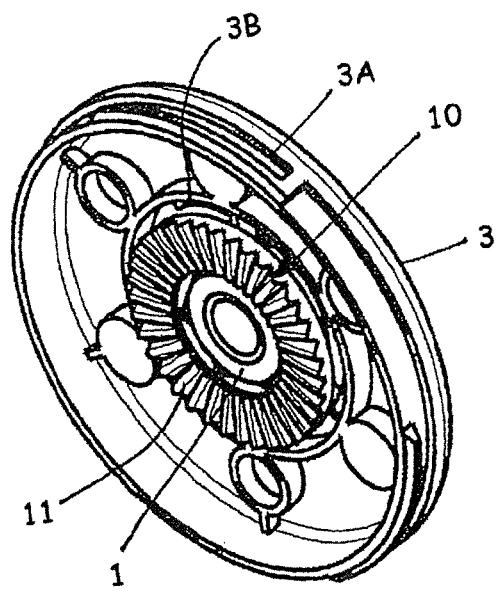
FIG. 4 is a partial internal view of the secure button of FIG. 1.
Figure 5:
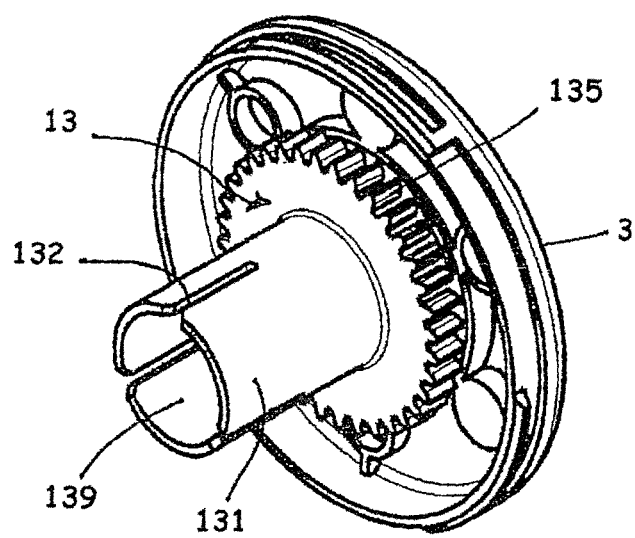
FIG. 5 is a partial internal view of the secure button of FIG. 1.
Figure 6:
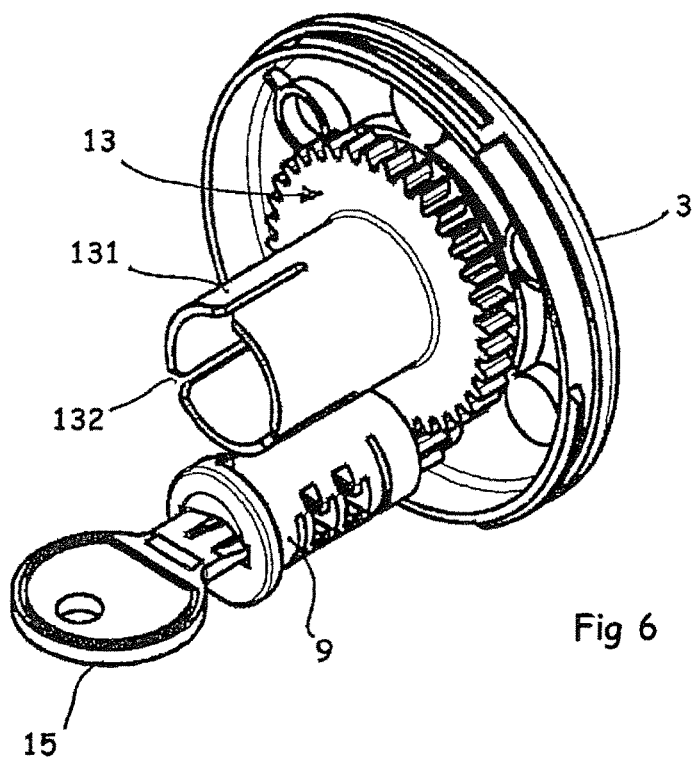
FIG. 6 is a partial internal view of the secure button of FIG. 1.
Figure 7:
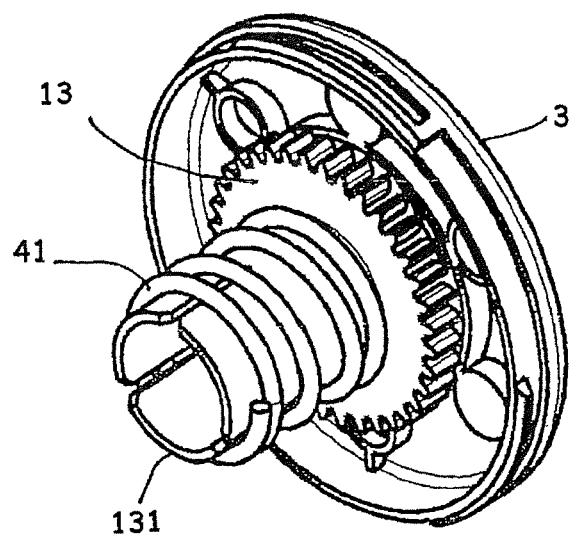
FIG. 7 is a partial internal view of the secure button of FIG. 1.
Figure 8:
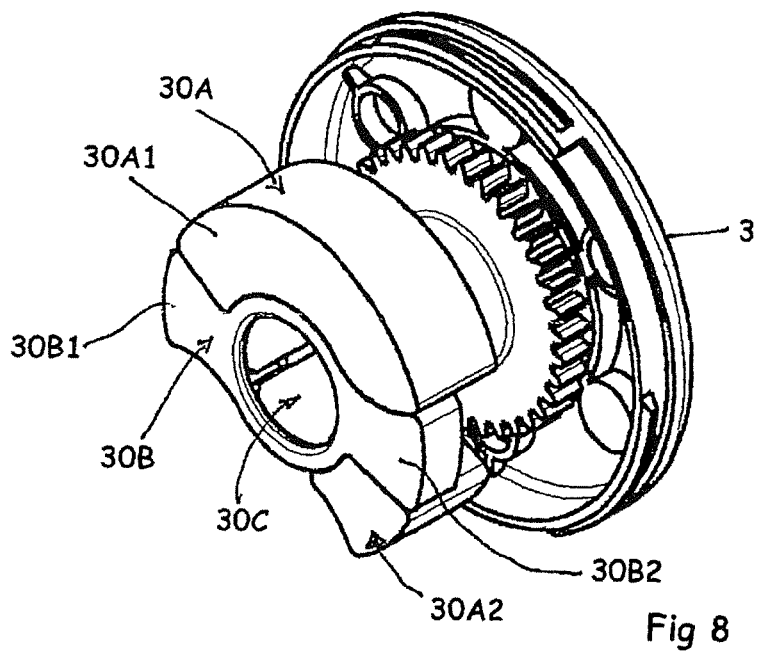
FIG. 8 is a partial internal view of the secure button of FIG. 1.
Figure 17:
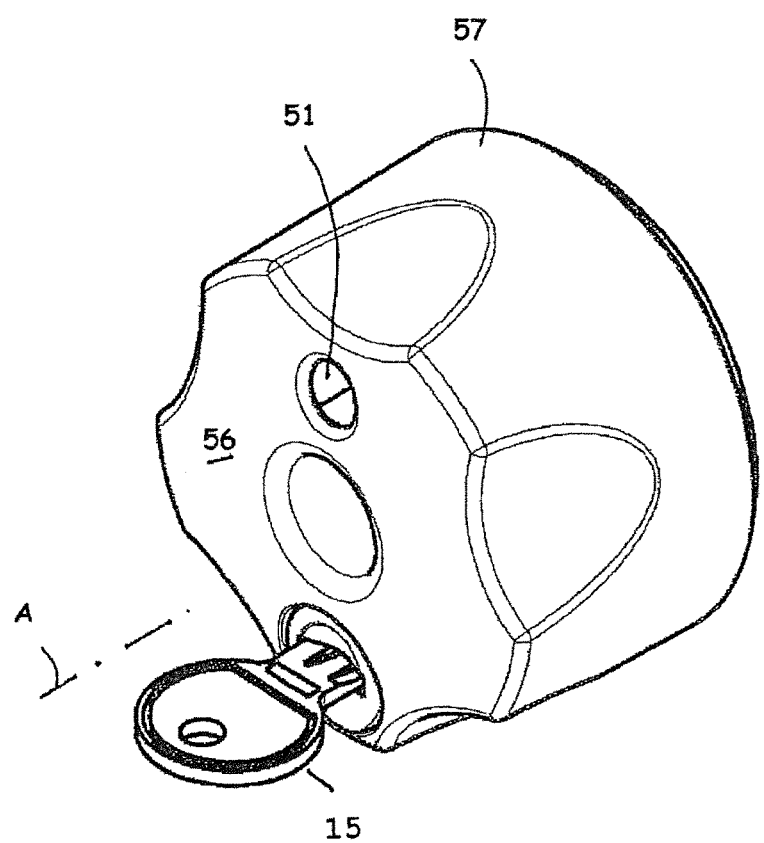
FIG. 17 is a perspective view of another button according to the invention similar to the one in FIG. 1.
Figure 18A:
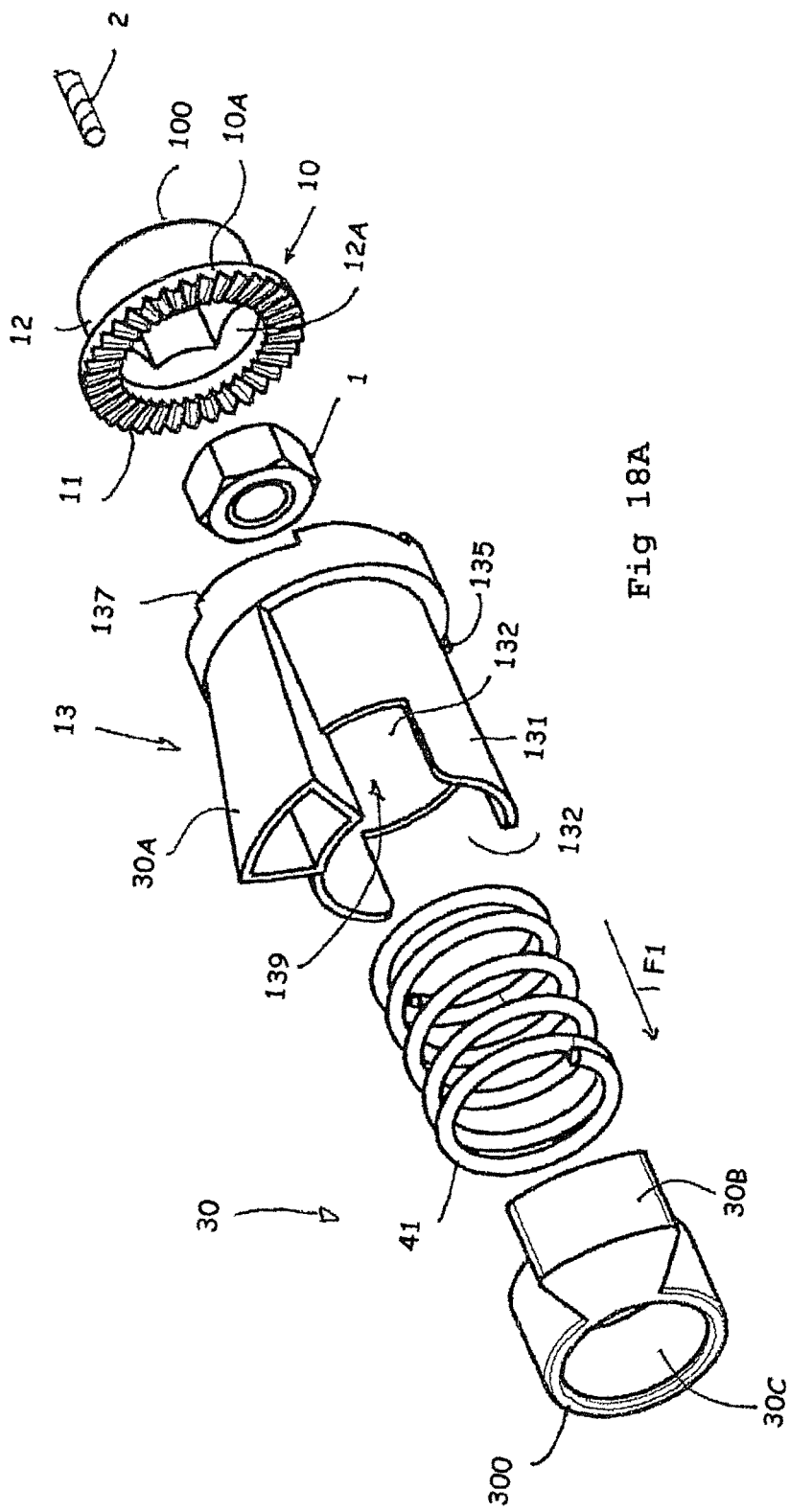
FIG. 18A is an exploded view of components of the button in FIG. 17.
Figure 18B:
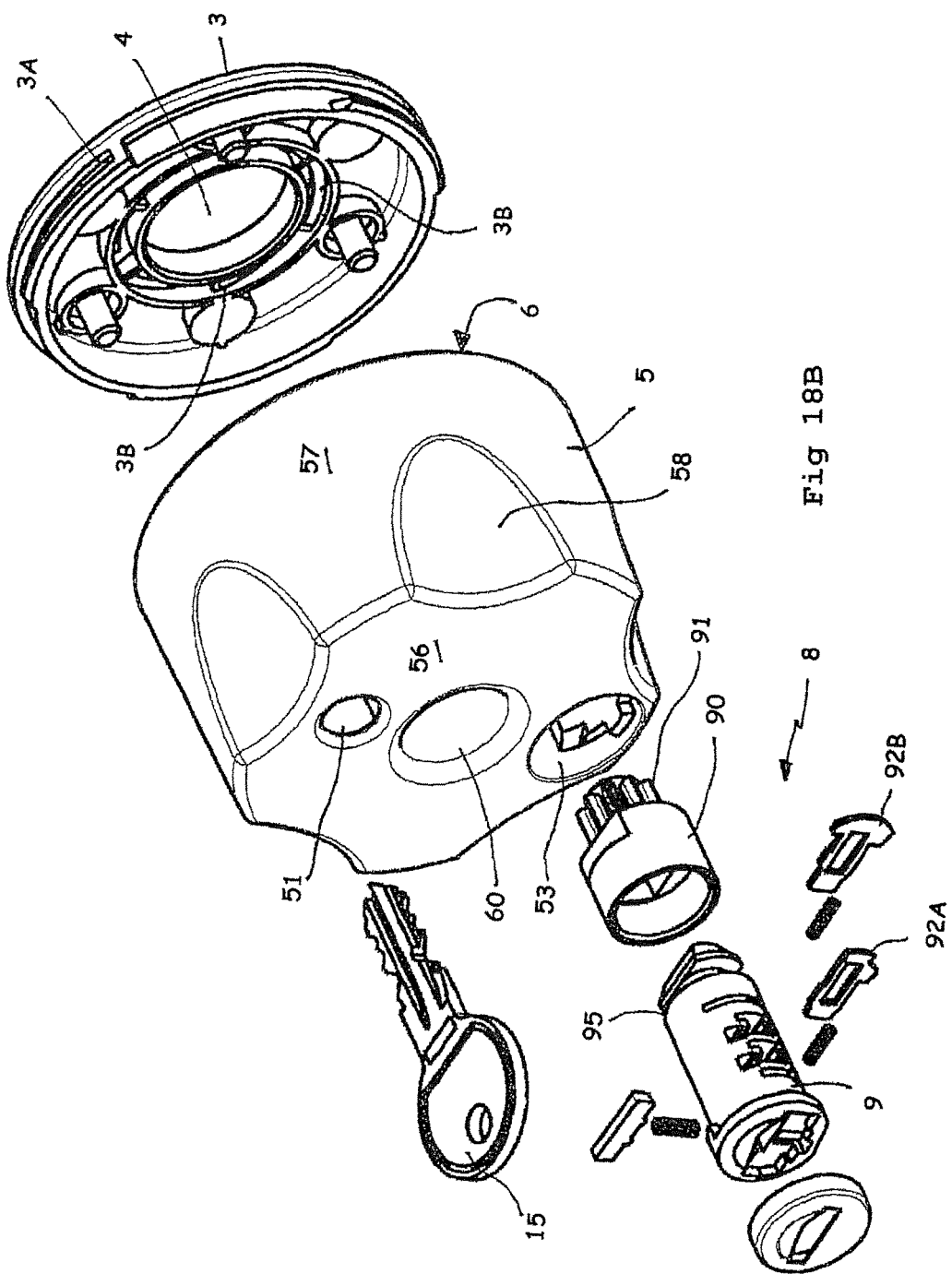
FIG. 18B is an exploded view of components of the button in FIG. 17.
Figure 22:
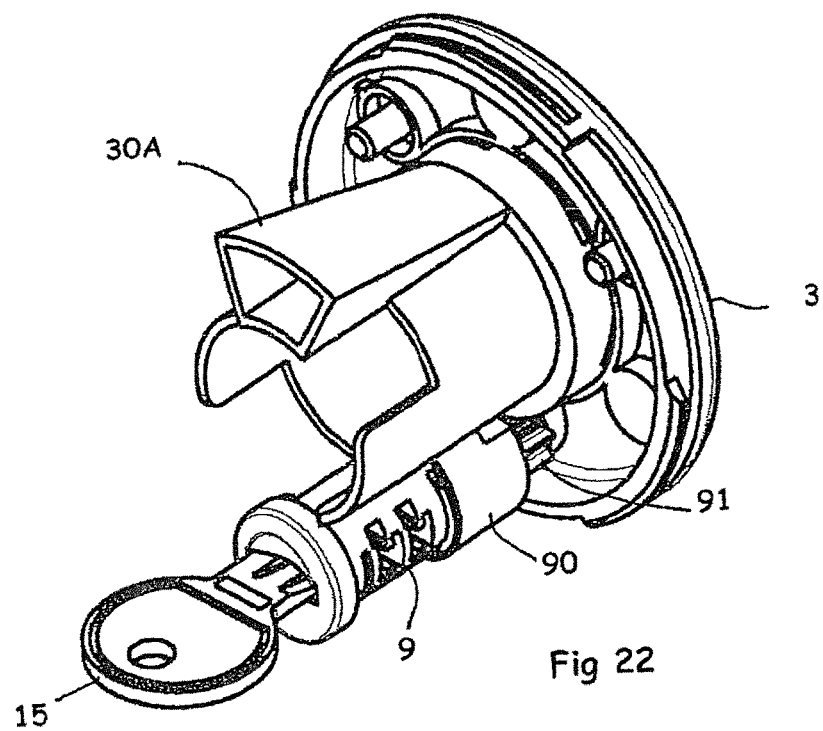
FIG. 22 is a partial internal view of the button in FIG. 17.
Figure 23:
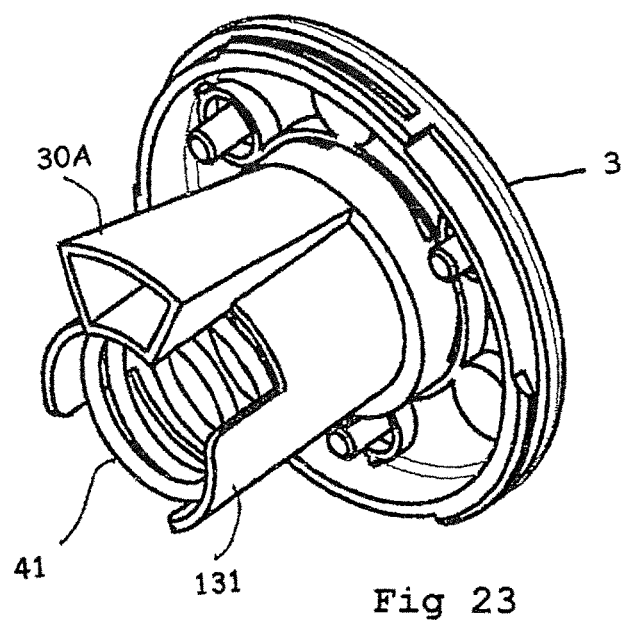
FIG. 23 is a partial internal view of the button in FIG. 17.
Figure 24:
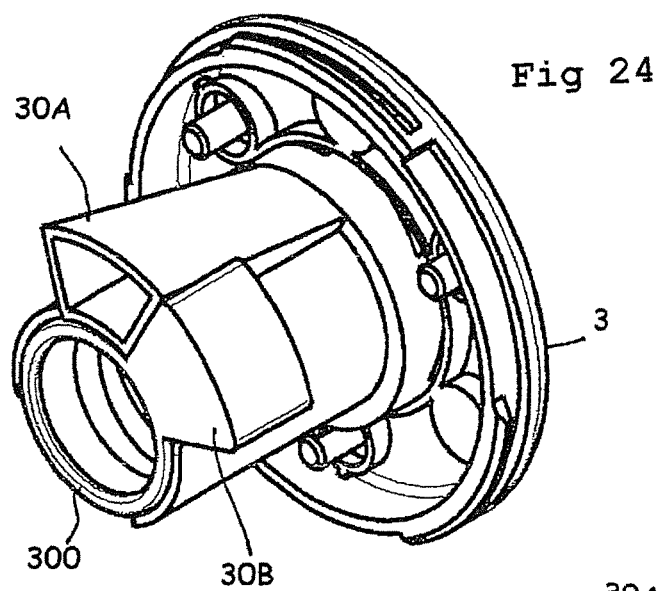
FIG. 24 is a partial internal view of the button in FIG. 17.
Figure 25:
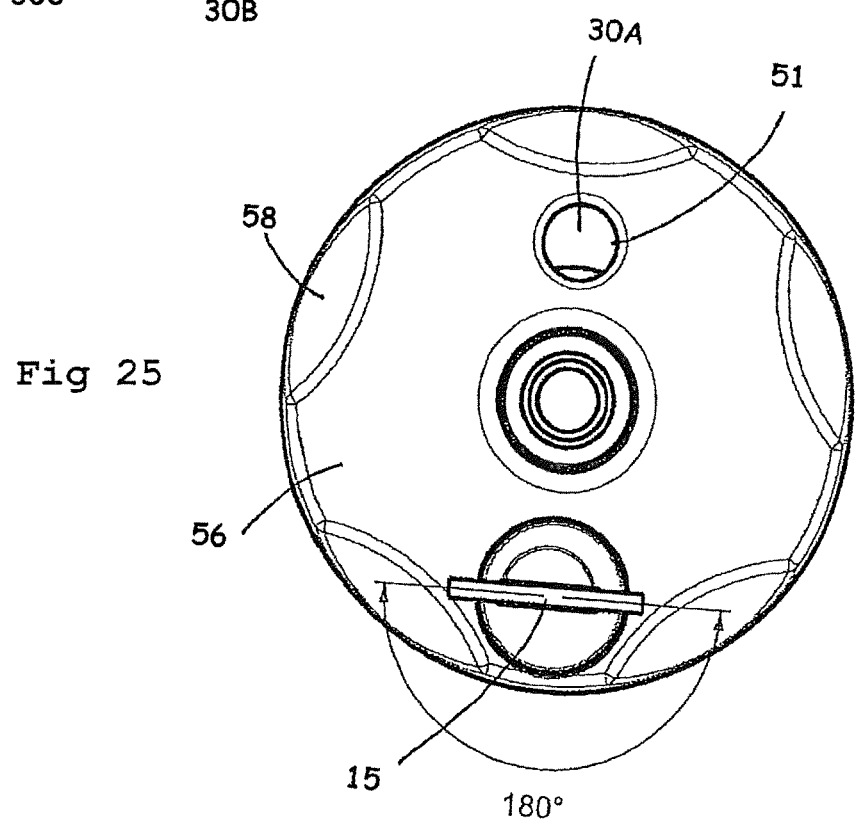
FIG. 25 is a front view of the button in FIG. 17 in the locked position.
Figure 26:
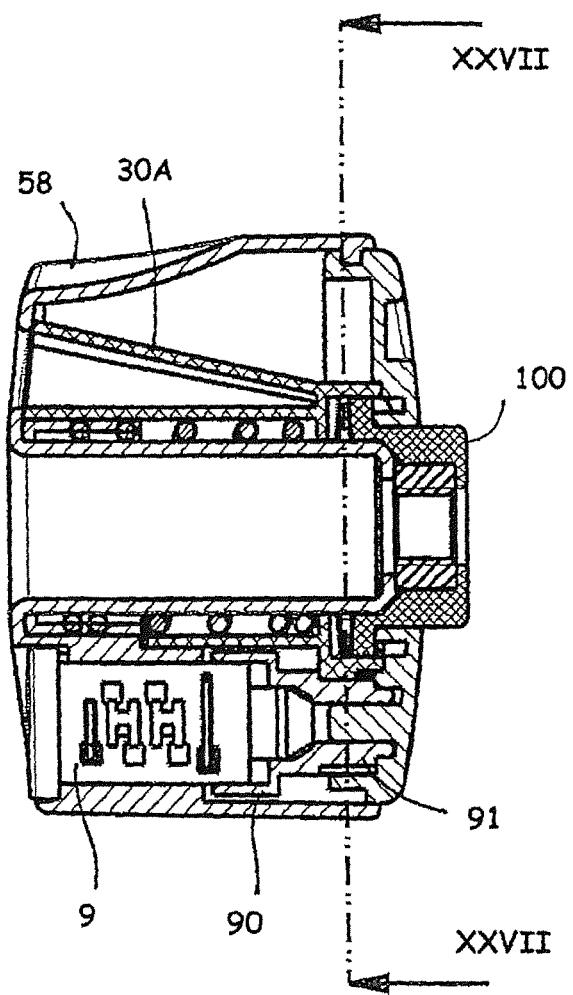
FIG. 26 is a sectional view along the lines XXVI-XXVI of the button in the locked position in FIG. 25.
Figure 27:
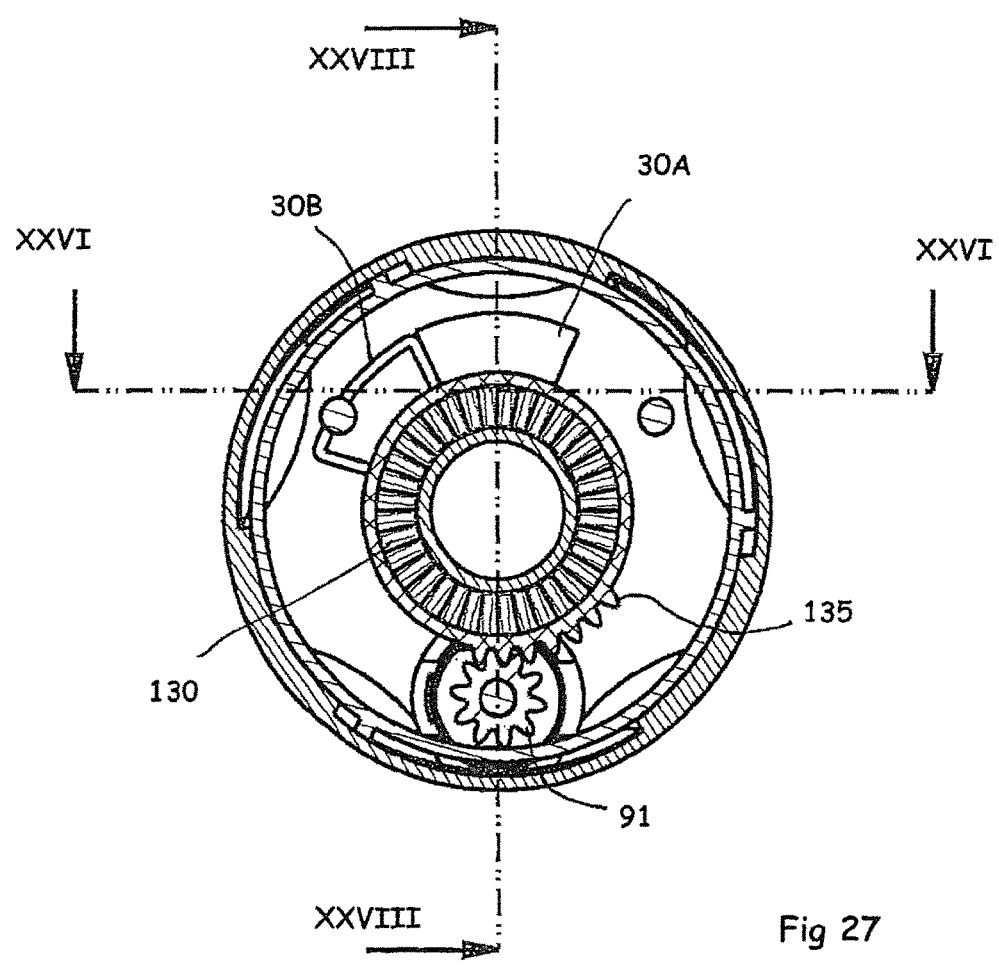
FIG. 27 is a sectional view along the lines XXVII-XXVII of the button in the locked position in FIG. 25.
Figure 28:
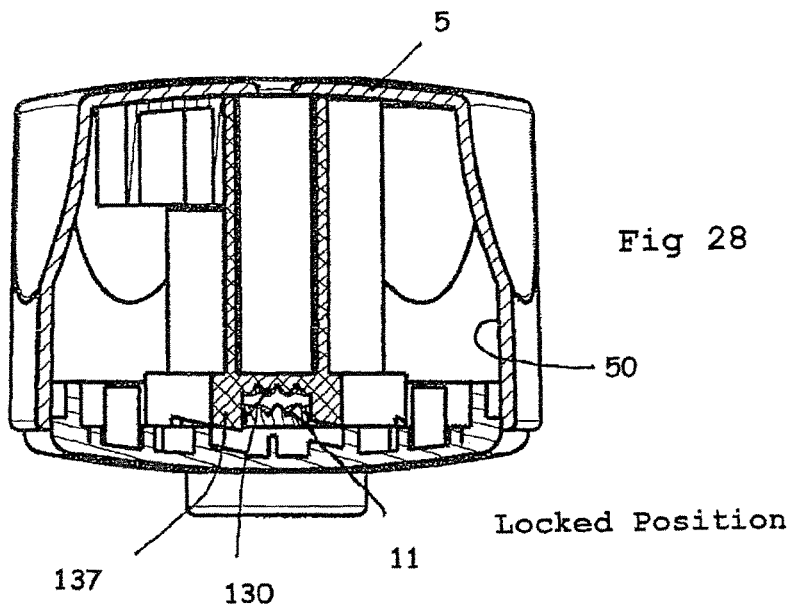
FIG. 28 is a sectional view along the lines XXVIII-XXVIII of the button in the locked position in FIG. 25.
Figure 29:
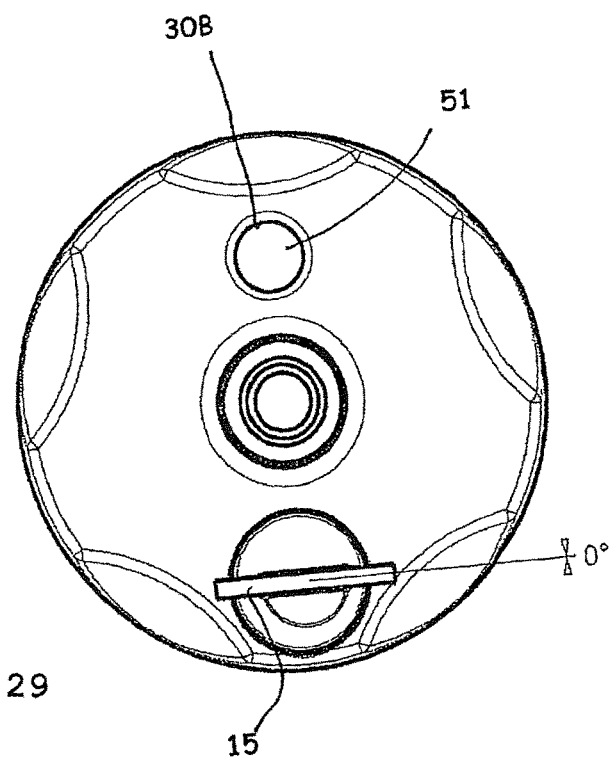
FIG. 29 is a front view of the button in FIG. 17 in the unlocked position.
Figure 30:
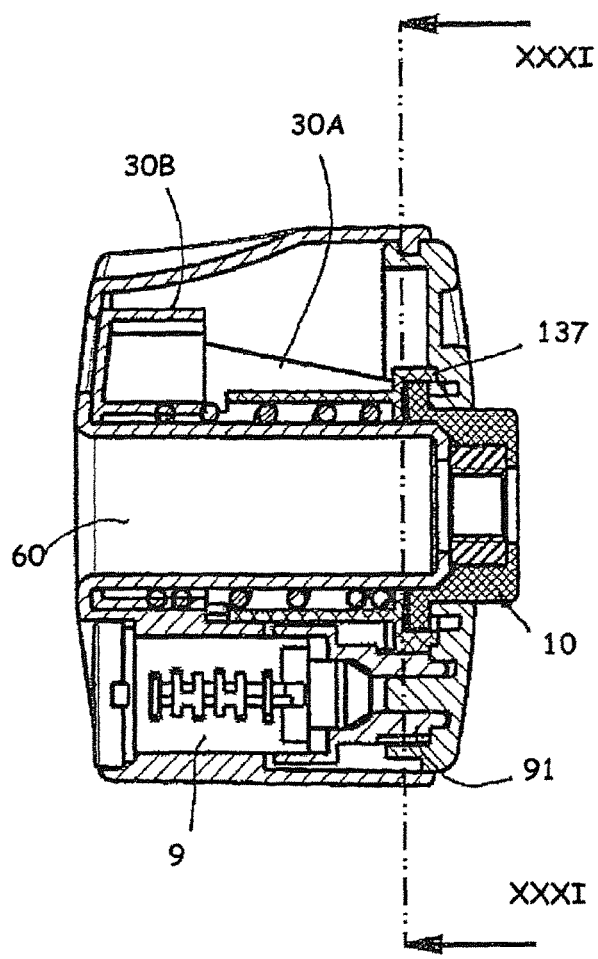
FIG. 30 is a sectional view along the lines XXX-XXX of the button in the unlocked position in FIG. 29.
Figure 32:
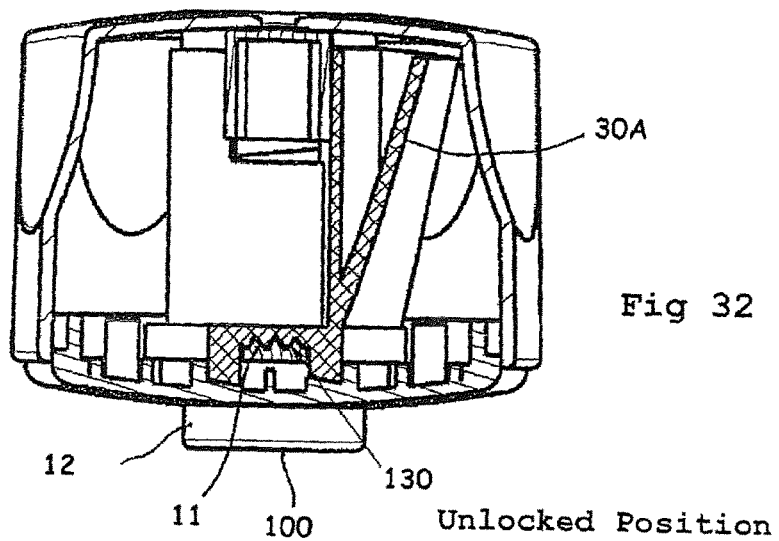
FIG. 32 is a sectional view along the lines XXXII-XXXII of the button in the unlocked position in FIG. 29.
Figure 31:
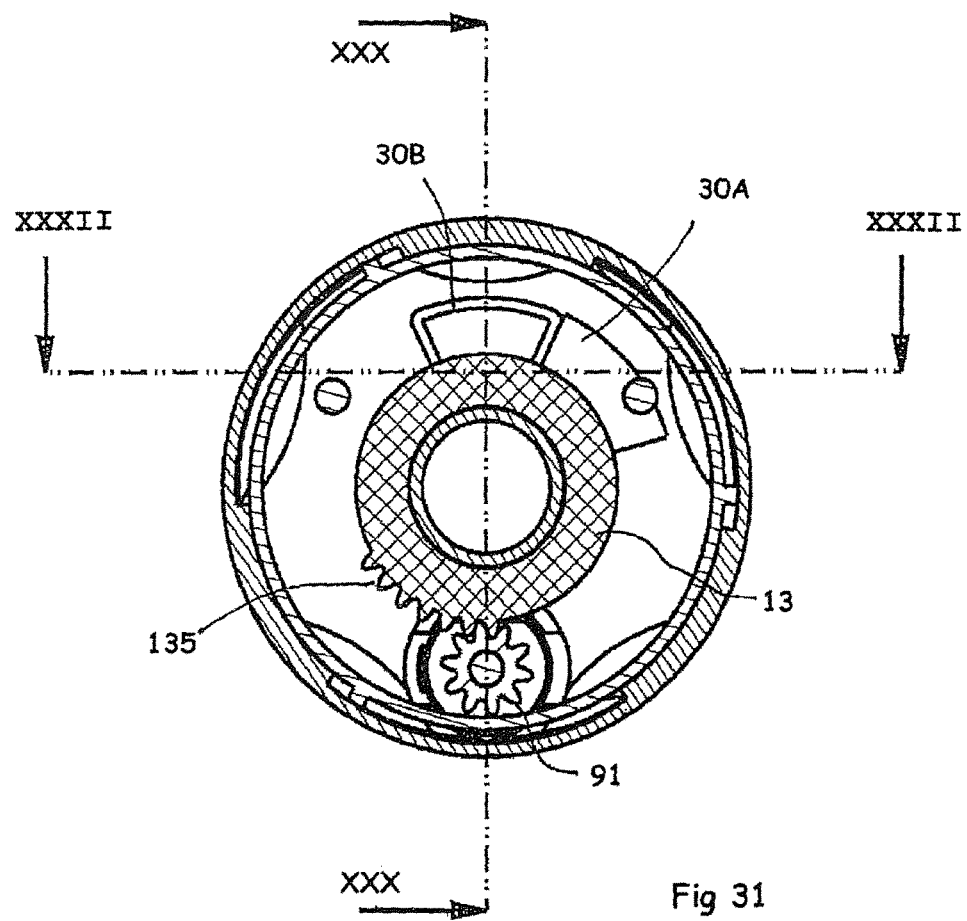
FIG. 31 is a sectional view along the lines XXXI-XXXI of the button in the unlocked position in FIG. 29.

FIG. 17 is a view of a button similar to that in FIG. 1, although only in that the cover 5 only has a single window 51 fitted with a transparent protective sheet. As is apparent from FIG. 18, the device is similar to that in FIG. 2, although only in that the indicator 30 and the main part 30A have a different shape.

The indicator 30 has the shape of a ring 300 with a central opening 30C and it bears a part 30B.

The plate 13 supports a tube 131 with a radial protuberance 30A (hollow in the form shown). The tube 131 has at least one slit 132 fitted to accommodate the base of the part 30B when the ring 300 extends at least partly into the cavity of the tube 131.

A spring 41 extends into the cavity of the tube 131 and tends to move the ring 300 away from the plate 13. The relative movement of the ring 300 towards the plate is then effected against the action of the spring 41.

The cover (5) has a front wall 56 and a side wall 57 fitted to grip onto the support (3), with the front wall 56 having the length of its internal face turned towards the chamber (6), with a tube 60 acting as a means of guidance fitted to work together with a cavity or opening 30C which has the ring 300 for the indicator 30, as well as with the cavity of the tube 131 supported by the plate 13 and the central opening 139 of the plate 13. This enables the correct alignment of the indicator 30 and the plate 13 to be ensured, even during an axial movement of the plate. The free end of the tube 60 is favourably adapted to act as a stop for the nut or for a smooth circular part of the support element 10 so as to limit any axial movement of the support element and prevent the teeth 11 of the support element 10 coming into contact with the teeth 130 of the plate 13 in the locked position. After a screwing operation, the rod 2 may pass through the nut 1 to have its end extending into the central tube 60 of the cover 5. It is evident that other means could have been used to limit an axial movement of the support element 10. For example, the support element 10 could be inserted into a housing of the support 3 by means of a clipping system enabling a rotation of the support element 10 in relation to the support 3.

In this embodiment the spring 41 extends between the circular wall of the central tube 60 and the internal wall of the tube 131 supported by the plate 13.

The working of the button in FIG. 17 is similar to that in FIG. 1.

FIGS. 19 to 24 show in perspective the arrangement on the support 3 of the support element 10, the plate 13, the tube 131 and the ring 300 with the part 30B. It is evident that a rotation of the plate 13 in relation to support 3 shall give rise to a rotation of the tube 131 and thus of the part 30B.

The cavity of the part 30A and one face of the part 30B are adapted to be placed in front of the window during a rotation of the plate 13.

While the tightening torque of the bolt 1 onto the rod 2 is lower than a defined value, screwing the button shall give rise to a rotation of the entire button, support 3 and cover 5. In this position the cavity of the part 30A extends in front of the window 51. Once a minimum tightening torque has been achieved, the rotation of the cover 5 in the locking direction shall produce a relative rotation movement between the plate 13 and the support 3. Due to the ramps 137 on the lower face of the plate 13 being supported on the inclined faces or ramps 3B of the support 3, this relative rotation movement shall produce a sliding of the ramps 137 of the plate 13 on the inclined faces 3B of the support 3, hence a movement moving the plate 13 away from the support 3 and hence enabling a free rotation of the button (support 3 and cover 5) in relation to the support element 10 and the bolt 1.

In FIGS. 17 to 32 for the second embodiment, the reference signs used for the first embodiment are used to designate similar elements or parts or those having the same function.

As the minimum tightening torque is not achieved, the button is in the unlocked position shown in FIGS. 29 to 32. In this position, the part 30A is situated opposite the window 51 so that the operator knows by a visual check that the button is still not properly locked.

When the locking of the button is greater than a minimum torque, the rotation of the button will not produce a rotation of the support element 10 of the bolt 1. A relative rotation of the button in relation to bolt 1 will then take place.

By effecting a rotation of the cylinder 9 by the key 15, one then controls a rotation of the plate 13 whose protuberances 137 then slide on the ramps 3B of the support 3 in order to produce an axial movement of the plate 13 towards a spaced apart position in which the teeth 130 are away from the teeth 11.

Figure 33A:
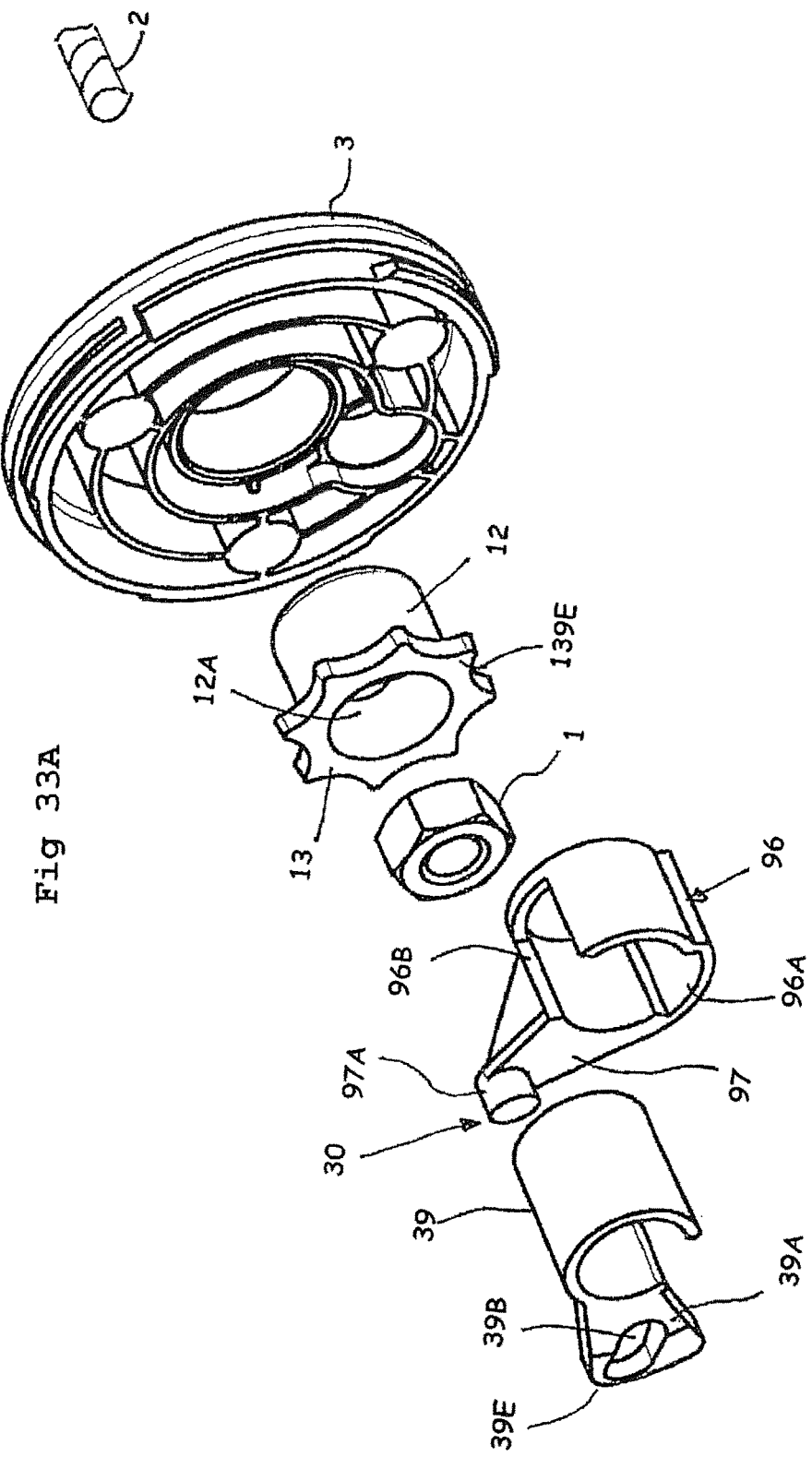
FIG. 33A is an exploded view of components of another button in accordance with the invention.
Figure 34:
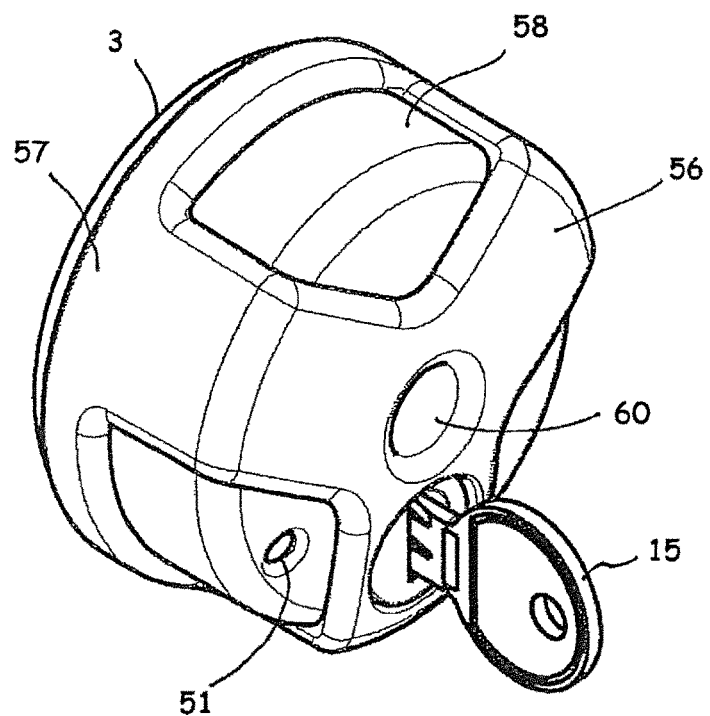
FIG. 34 is a perspective view of the button in FIGS. 33A and 33B.
Figure 35:
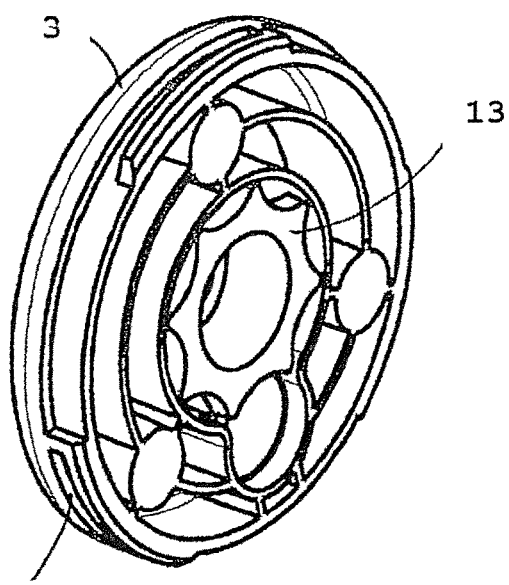
FIG. 35 is a partial perspective view of the button in FIG. 34.
Figure 36:
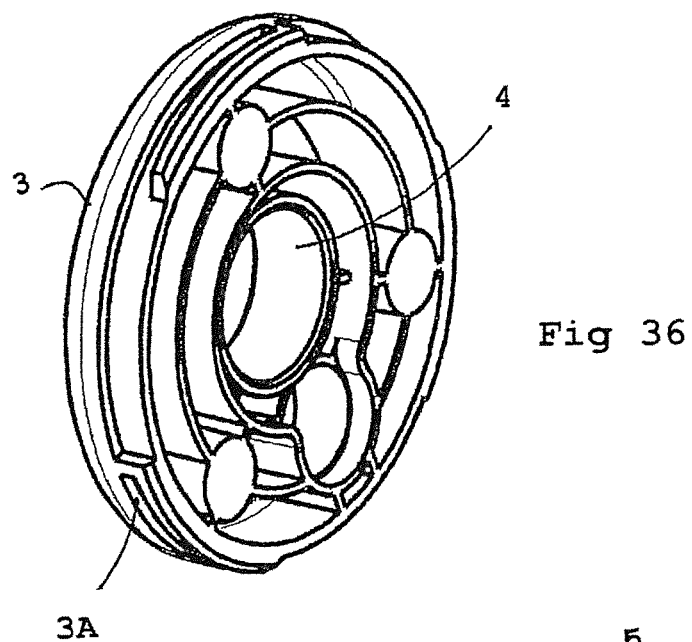
FIG. 36 is a partial perspective view of the button in FIG. 34.
Figure 37:
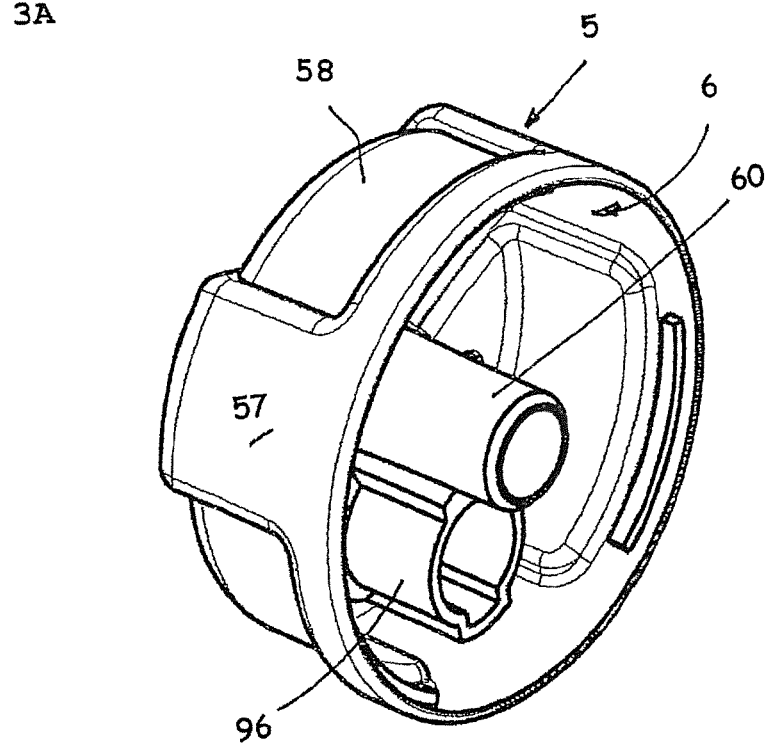
FIG. 37 is a partial perspective view of the button in FIG. 34.
Figure 38:
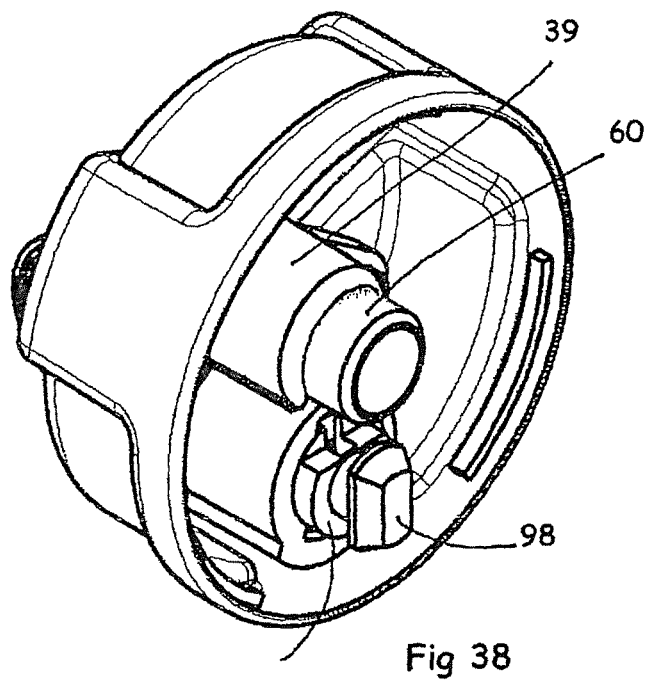
FIG. 38 is a partial perspective view of the button in FIG. 34.
Figure 39:
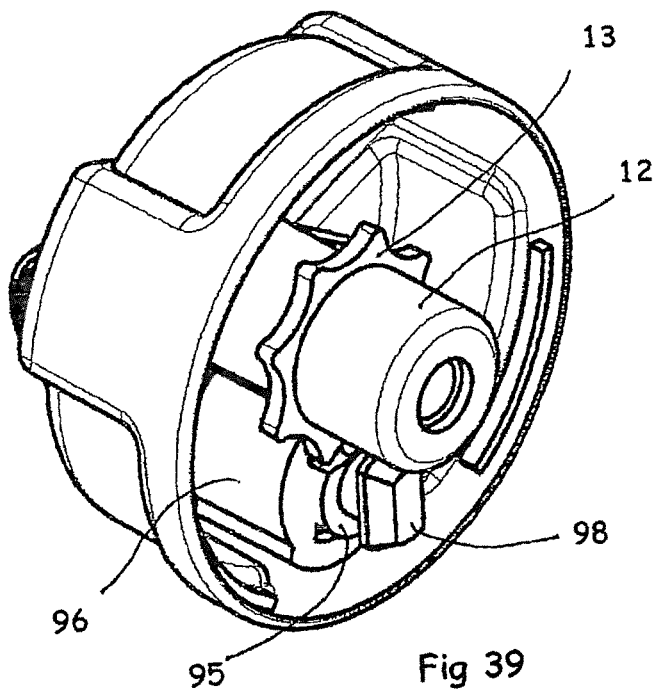
FIG. 39 is a partial perspective view of the button in FIG. 34.
Figure 40:
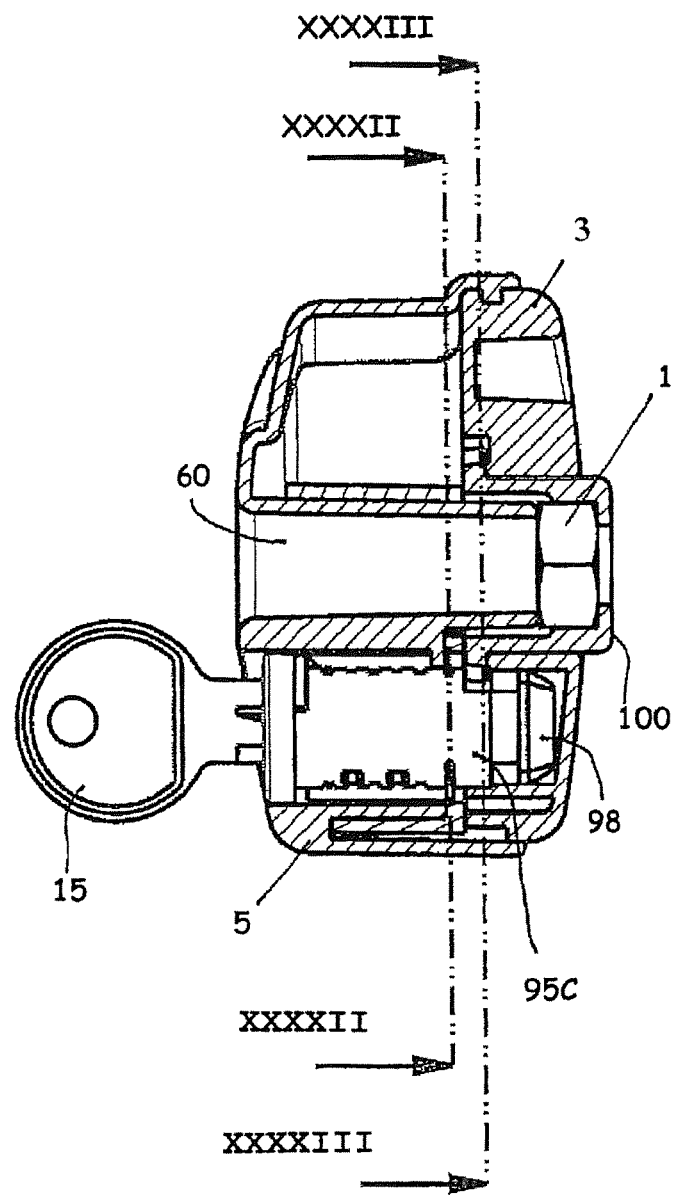
FIG. 40 is a sectional view of the button in FIGS. 33A and 33B in the locked position.
Figure 41:
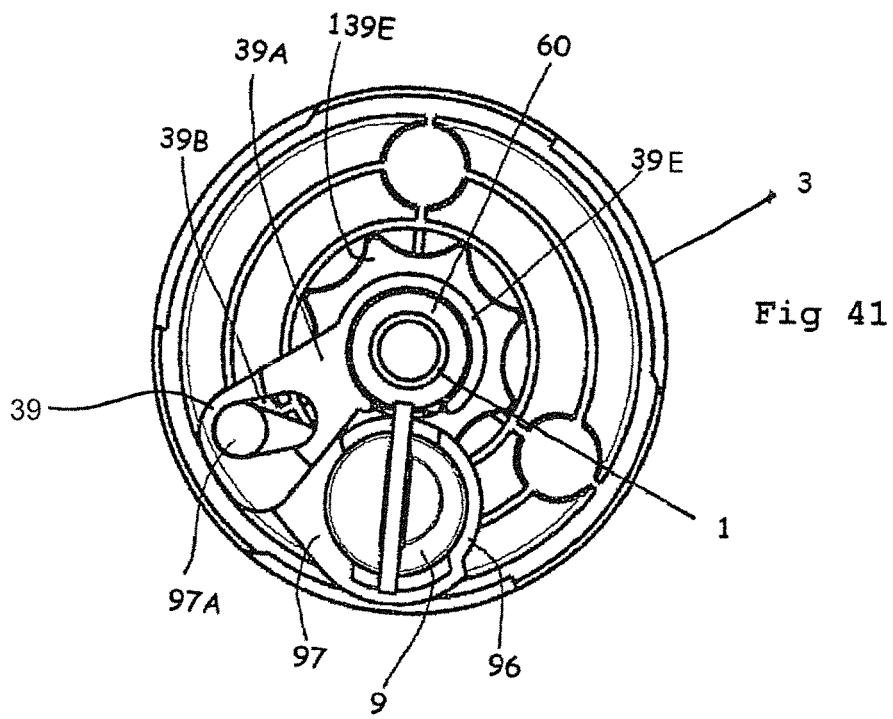
FIG. 41 is a view of the button in FIG. 40 with partial removal of the cover (5) and in section along the lines XXXXII-XXXXII.
Figure 42:
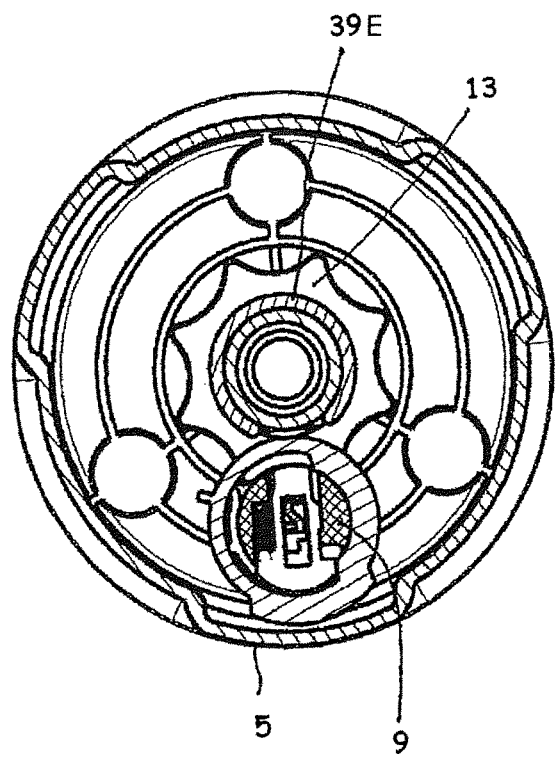
FIG. 42 is a view of the button in FIG. 40 with partial removal of the cover (5) and in section along the lines XXXXIII-XXXXIII.
Figure 43:
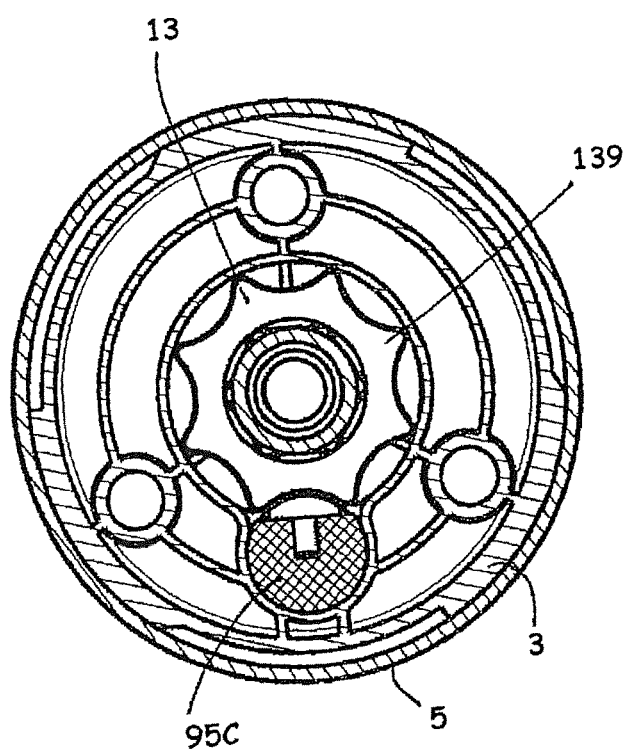
FIG. 43 is another sectional view of the button in FIG. 40 with partial removal of the cover (5)
Figure 44:
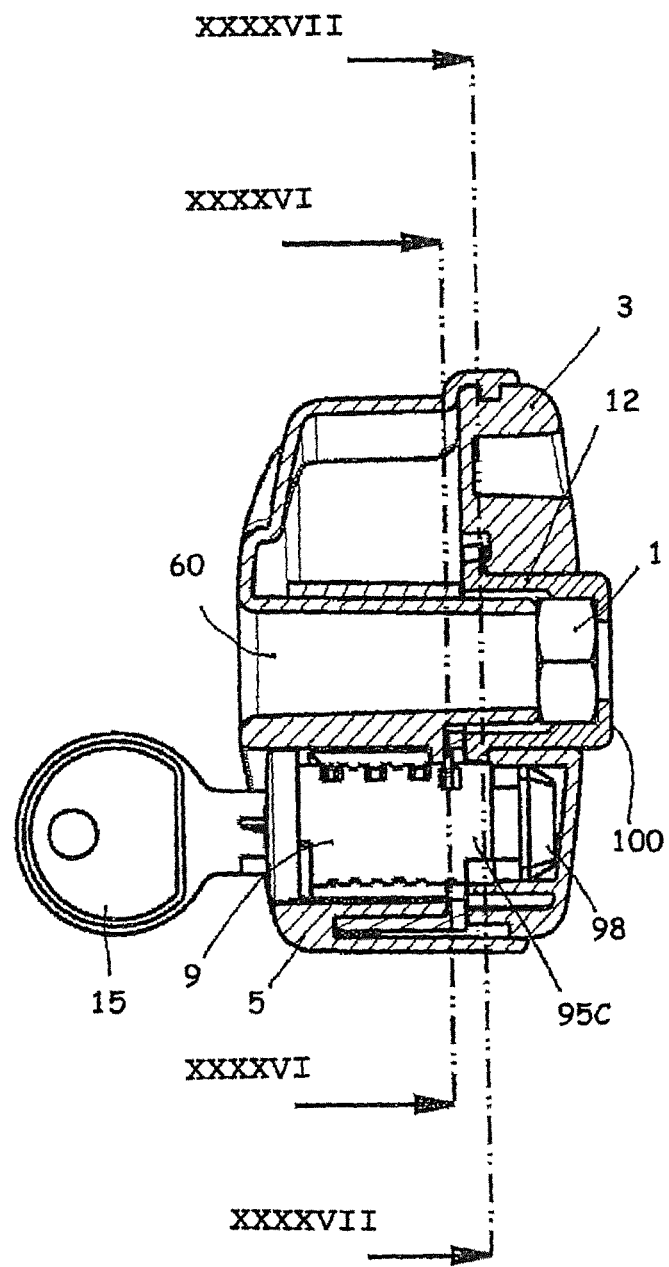
FIG. 44 is a sectional view of the button in FIG. 33 in the unlocked position.
Figure 45:
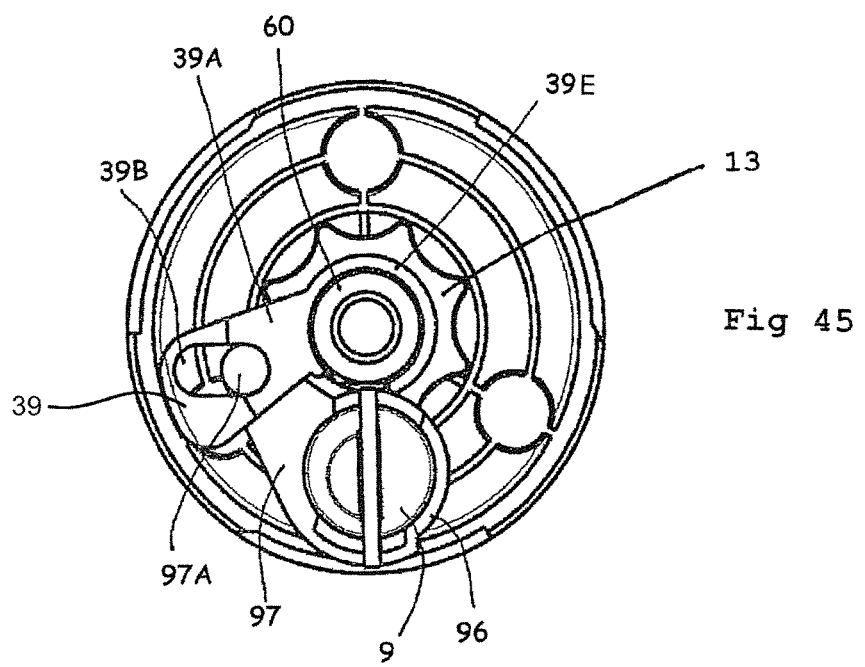
FIG. 45 is a view of the button in FIG. 44 with partial removal of the cover (5) and in section along the lines XXXXVI-XXXXVI.
Figure 46:
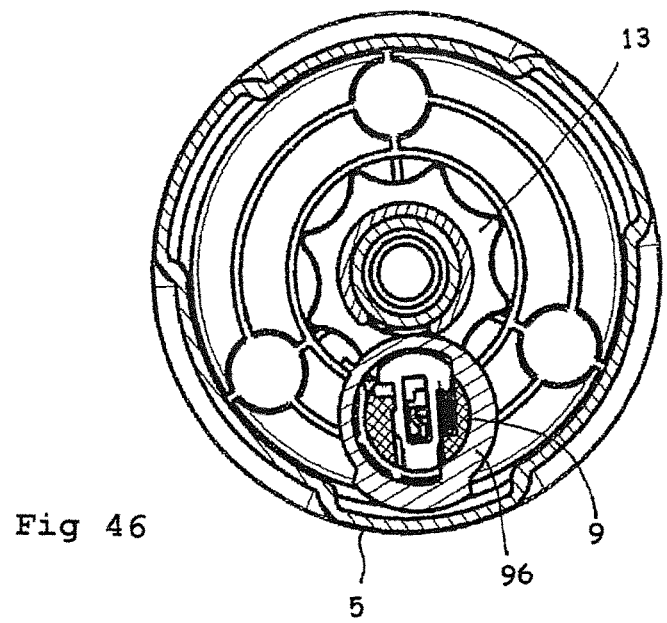
FIG. 46 is a view of the button in FIG. 44 with partial removal of the cover (5) and in section along the lines XXXXVII-XXXXVII.
Figure 47:
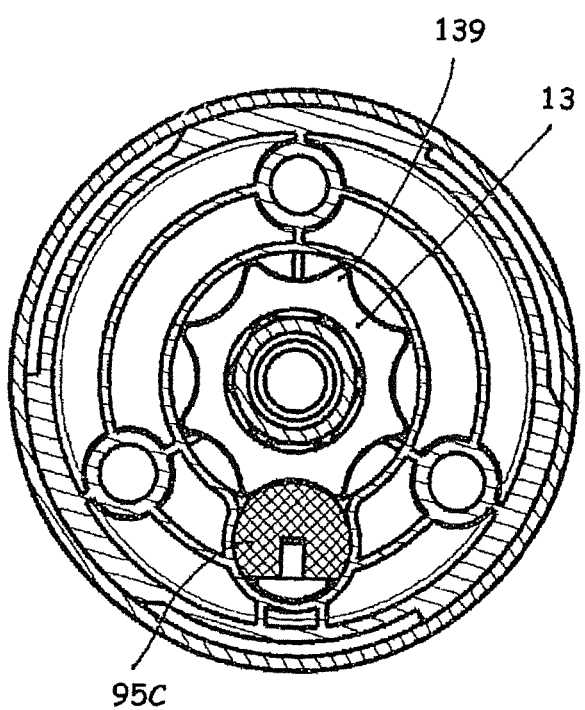
FIG. 47 is another sectional view of the button in FIG. 44 with partial removal of the cover (5).

FIG. 33 has as its subject another button with a position indicator device for the cylinder 9 and therefore for the position of the control key 15.

This button, an embodiment of which is shown in FIGS. 33 to 47, is linked to a nut (1) adapted to be fastened by rotation onto a threaded rod (2), preferably a bolt, by exerting a tightening torque, in particular a given minimum tightening torque. The aforesaid rotation of the element (1) is effected in relation to an axis of rotation (A) corresponding either to the threaded rod's longitudinal axis (A) or to the central axis of the nut (1), with the aforesaid rotation acting in a first direction (R1), favourably clockwise, to fasten the element (1) onto the threaded rod (2) and in a second direction (R2), favourably anti-clockwise, opposed to the aforesaid first direction (R1) to withdraw the (1) from its fixed position.

The aforesaid button shown comprises:
- a support (3) having an opening (4) either for the threaded rod (2) adapted to be fastened by rotation onto the element in the shape of the nut (1) or for the element (1) in the form of a threaded rod adapted to be fastened to a nut by rotation, with the element (1) being fitted into the aforesaid opening so as to be able to turn in rotation there around the aforesaid axis of rotation (A);
- a cover (5) fitted onto the aforesaid support (3) and defining a chamber (6) with the aforesaid support,
- a plate (13) linked to or capable of being linked to the aforesaid element (1), with the aforesaid plate being situated in the aforesaid chamber and being fitted to move in the aforesaid chamber,
- a locking mechanism (8) comprising a rotor (9) controlled by a key (15) and moving between an open (or unlocked—FIG. 44) position in which a link is formed between on the one hand the plate (13) and, on the other, the cover (5) or support (3) to enable at least the conversion of a rotation movement of the cover or support into a rotation movement of the element (1) in relation to the threaded rod (2) in the unfastening direction (R2) of the aforesaid element (1) to the aforesaid threaded rod, and a closed (or locked—FIG. 40) position in which the rotation of the support or the cover does not involve the rotation of the element (1) fastened onto the corresponding threaded rod (2) (at least when the tightening torque of the element (1) is greater than the aforesaid minimum tightening torque. In fact, the link between the nut 1 and the support could be such as to enable a rotation movement, in the screwing direction for example, while the tightening torque would be lower than a given minimum tightening torque), and
- a means of connection (part 95C at the end of the rotor 9) between the aforesaid plate (13) and the aforesaid element (1), with the aforesaid means of connection being fitted to move in relation to the cover or support (3) between a first position adjusted to ensure that a rotation of the support (3) and the cover (5) ensures a rotation the plate (13) in the first and second directions (R1, R2), and a second position adjusted to ensure that a rotation of the support (3) and the cover (5) does not drive the plate (13) in rotation, at least in the second direction (R2), preferably in the first and second directions (R1, R2) (for example when the plate 13 is fitted to rotate freely in relation to the support 3).

The rotor (9) of the locking mechanism (8) is fitted to control the movement of the means of connection (95C) between its first position and its second position and conversely, whilst the cover (5) has at least one window (51) for an indicator (30) for at least one position chosen from the first position of the means of connection (95C) and the second position of the means of connection (95C). In the form shown, the cover only has a single window.

The indicator (30) is connected to the plate (13) by a part (9) attached to the means of connection (95C). The means of connection (part 95C) is an end portion of the rotor (9) for the means of locking (8), with the aforesaid end portion (95C) being adjusted so that in a first position the part 95C is away from the plate (13) and so that in a second position the aforesaid part (95C) acts on the aforesaid plate (13). In the first position, the plate 13 is free to turn in the first direction and the second direction, whilst in its second position, the plate 13 is capable of being driven in rotation by the rotation of the cover 5.

The cover 5 has a central guide 60 extending into the chamber 6. The indicator 30 is linked to a part 39 fitted to rotate in relation to the guide 60 of the cover 5. The axis of rotation of the part 39 is favourably parallel to the axis of rotation of the connection part 95C supported by the rotor 9. The axis of rotation of the part 39 is the button's axis A-A of rotation. The axes of rotation of the rotor and button are separated from each other.

The part 39 is fitted to work together with an element 96 fitted around at least one part of the rotor. This element 96 has grooves or slots 96A, 96B fitted to accommodate one or more of the ends of the eyelet structures of the rotor 9 to enable a rotation of the element 96 following a rotation of the rotor 9. The cavity of the element 96 is therefore fitted to accommodate the rotor 9. This element 96, if it were not fitted to rotate, would constitute the stator of the locking system 8. The end of the rotor has an eyelet structure engaged in a groove of the central tube 60 and a foot 98 engaged in a cavity which the support 3 has. The element 96 is engaged in the chamber 6 of the cover when the support 3 is not joined together with the cover 5.

The upper edge of the element 96 is supported against an internal wall of the front face of the cover 5. The element 96 bears an arm 97 fitted to work together with an arm 39A of the part 39 so that a rotation movement of the element 96 around the axis of rotation of the rotor 9 generates a rotation movement of the part 39 around an axis apart from the axis of rotation of the rotor 9, favourably the button's axis of rotation A-A.

The means of working together between the arms 97, 39A is favourably a cam (for example 97A) supported by one of the arms (for example 97) capable of sliding in a groove or window (for example 39B). The cam 97A is for example situated at a greater distance from the axis of rotation of the rotor than the distance separating this axis of rotation from the button's axis of rotation A. The movement of the cam is guided in the groove or window 39B and enables a rotation movement of the element 96 to be converted into a rotation movement of the part 39. During the rotation of the rotor 9 towards its locked position or its unlocked position, a part of one arm 39A and/or 97 or the cam 97A (similar to indicator 30) is positioned behind the window 51 of the cover 5 to indicate the locked or unlocked position of the rotor 9 and thus of the button.

The arm 39A has one end 39E which has a profile in the arc of a circle whose centre corresponds to the axis of rotation of the part 39. This end 39E is favourably fitted to slide along an internal wall, with this internal wall having a surface which has a circular curve having as its centre of curvature the axis of rotation of the part 39. This internal wall is favourably a portion of the internal side wall of the cover 5. This is attractive since it provides a stiffening of the central tube 60 and better stability for the button.

The plate 13 has a series of teeth 139E which between them define the cavities fitted to accommodate the end part 95C in the unlocked position. In the locked position, the free end of the teeth does not come into contact with the end part 95C, thus enabling a free rotation of the support and the cover 5 in relation to the plate 13 and the bolt 1. The plate 13 is connected to a tube 12 fitted to extend at least partly into the opening 4 of the support 3. This tube 12 acts as a means of guidance for the rotation of the plate 13 in relation to support 3. In the embodiment shown in FIG. 33, the tube has a cavity fitted to accommodate the bolt 1. The bolt is connected to the tube. The bolt 1 is inserted into the tube 12 such that the bolt is away from the free end of the tube turned towards the chamber 6.

The cover is connected to a central tube 60 extending into the chamber 6 of the cover 5. The end of this central tube (extending along the axis of rotation A of the cover 5 and the support 3) is fitted to extend partly into the cavity of the tube 12 attached to the plate 13. This enables movements in the axis A of the plate 13 in relation to support 3 to be limited and even avoided. This also enables additional guidance for the tube 12 to be provided during a relative rotation movement of the plate 13 in relation to the support 3.

In accordance with another advantageous detail of this preferred embodiment, the central tube 60 acts as a means to guide the rotation for the part 39. For example, the part 39 has the shape of a ring or part ring, for example split or with a part removed, which is fitted onto the central tube 60. The base of the ring may give support on the plate 13 so as to limit or avoid axial movements of the plate 13 in relation to the support 3.

FIGS. 40 to 43 show the button in the locked position, a position enabling a free rotation of the button by avoiding any rotation of the plate 13. The end part 95C does not extend between two teeth 139E of the plate 13.

FIGS. 44 to 47 show the button in the unlocked position, a position which enables a rotation of the plate 13 with the cover 5. In this position the end part 95C of the rotor 9 extends into the cavity between two teeth 139E of the plate 13.

The invention claimed is:

1. A button configured to be linked to a fastening element adapted to be fastened by rotation in a first direction around an axis of rotation on a counter element selected from the group comprising a counter nut with a central axis and a counter threaded rod with a longitudinal axis, said fastening element being adapted to be withdrawn from the said counter element by rotation in a second direction opposite to the first direction, whereby the rotation of the fastening element in the first direction fastens the fastening element onto the counter element, said counter element having an axis selected from the group comprising the longitudinal axis of the counter threaded rod and the central axis of the counter nut, in which the fastening element is selected from the group comprising:

when the counter element is the counter threaded rod, a fastening nut having a central axis and adapted to be fastened by rotation around said central axis of the fastening nut onto the counter threaded rod acting by exerting a tightening torque, said central axis of the fastening nut corresponding to the axis of rotation of the fastening nut onto the counter threaded rod, and when the counter element is the counter nut, a fastening threaded rod having a longitudinal axis and adapted to be fastened by rotation around said longitudinal axis of said fastening threaded rod onto the counter nut by exerting a tightening torque, said longitudinal axis of the fastening threaded rod corresponding to the axis of rotation of the fastening threaded rod onto the counter nut, in which aforesaid button comprises:

a support having an opening either for a counter threaded rod as the counter element adapted to be fastened by rotation onto a fastening nut acting as the fastening element, or for a fastening threaded rod acting as the fastening element adapted to be fastened by rotation to a counter nut acting as the counter element, said support comprising a support element attached to the fastening nut or the fastening threaded rod, said support element being mounted rotatable with respect to the support around the aforesaid axis of rotation and having a surface provided with teeth, in which the support element with the fastening nut element or the fastening threaded rod is fitted at least partly into the aforesaid opening of the support so as to be able to turn in rotation with respect to said support around the aforesaid axis of rotation;

a cover fitted onto the aforesaid support and defining a chamber with the aforesaid support, a plate configured to be linked to the aforesaid fastening element, in which the aforesaid plate has a face provided with teeth directed towards the teeth of said surface of the support element, in which the aforesaid plate is situated in the aforesaid chamber and is fitted to move in the aforesaid chamber between a first position in which the teeth of the said face of the aforesaid plate are working with the teeth of the said surface of the support element, so that a rotation of the plate drives into rotation the support element, and a second position in which the teeth of the face of the plate are away from the teeth of the surface of the support element, a locking mechanism comprising a rotor controlled by a key and moving between (a) an open position in which a link is formed between on the one hand the plate and, on the other hand, a piece selected from the group consisting of the cover and the support to enable at least the conversion of a rotation movement of the said piece into a rotation movement of the fastening element and the plate in relation to the corresponding counter element in the second direction of the aforesaid fastening element onto the aforesaid corresponding counter element, and (b) a closed position in which the rotation of the support or the cover does not drive the rotation of the fastening element fixed to the aforesaid corresponding counter element, at least when the tightening torque exerted by the fastening element onto the counter element is greater than a minimum tightening torque, and a means of connection between the aforesaid plate and the aforesaid support element, said means of connection controlling the position of the plate with respect to the support element, with the aforesaid means of connection being fitted at least (a) to ensure that a rotation of the support element and the plate in the first direction drives a rotation of the fastening element when the increasing tightening torque exerted by the fastening element onto the counter element is perceptibly lower than the minimum tightening torque, (b) to ensure, when the tightening torque exerted by the fastening element onto the counter element is at least equal to roughly the minimum tightening torque, that a rotation of the plate in the first direction does not involve a rotation of the support element, and (c) to ensure that in the closed position of the rotor of the locking mechanism, a rotation of the plate in the second direction does not drive in rotation of the support element, at least when the tightening torque exerted by the fastening element onto the counter element is at least roughly equal to the aforesaid minimum tightening torque, in which the cover has at least one window for an indicator for at least one position selected from the group consisting of a first indicator position for indicating that the button is fastening the fastening element and a second indicator position for indicating that the locking mechanism has been activated to the closed position such that the button is not fastening the fastening element, and in which the indicator is connected to the plate by a means ensuring that a rotation of the plate is translated into a rotation of the indicator, and in which the cover comprises a means limiting the rotation of the indicator and thus of the plate.

2. The button of claim 1, in which the cover comprises at least one interior wall forming a housing adapted to accommodate the rotor, in which the means for limiting the rotation of the indicator and thus of the plate is formed by a part of a wall selected from the group consisting of a part of at least one wall forming the aforesaid housing, a part of the wall of the rotor, and combinations thereof.

3. The button of claim 1, in which the indicator is connected to the plate by a means fitted to enable a translation movement parallel to the aforesaid axis of rotation between at least a part of the indicator and aforesaid plate, and in which a force exerting means extends between the aforesaid part of the indicator and the aforesaid plate to exert a force which tends to move the aforesaid part of the indicator away in relation to the aforesaid plate.

4. The button of claim 3, in which the cover is attached to the support by connection systems comprising at least one lug joined to at least one piece selected from the group consisting of the cover and the support, said at least one lug being adapted to fit into at least one recess which the said piece selected from the group consisting of the cover and the support has, and in which the force exerting means, by exerting a force which tends to move the aforesaid part of the indicator away in relation to the aforesaid plate, is adapted to also exert a force which tends to increase the latching of the cover onto the support.

5. The button of claim 3, in which the plate is fitted to move on the support so as to be able to move in parallel to the axis of rotation between a position where the plate is brought closer to the support element and a position where the plate is moved away from the support element.

6. The button of claim 1, in which the indicator is connected to the plate by a means fitted to enable a translation movement parallel to the aforesaid axis of rotation between at least a part of the indicator and aforesaid plate, in which a force exerting means extend between the aforesaid part of the indicator and the aforesaid plate to exert a force which tends to move the aforesaid part of the indicator away in relation to the aforesaid plate, and in which the force exerting means is an elastic means.

7. The button of claim 1, in which the indicator is connected to the plate by a means fitted to enable a translation movement parallel to the aforesaid axis of rotation between at least a part of the indicator and aforesaid plate, in which a force exerting means extend between the aforesaid part of the indicator and the aforesaid plate to exert a force which tends to move the aforesaid part of the indicator away in relation to the aforesaid plate, and in which the force exerting means is a spring.

8. The button of claim 1, in which the plate supports an elongated element selected from the group consisting of a tube and a rod, said elongated element having at least one means of guidance, in which the indicator comprises a part capable of sliding relatively with respect to the elongated element supported by the plate, in which the said part of the indicator comprises at least one means selected from the group consisting of protuberance, recess or a combination thereof, and in which said at least one means selected from the group consisting of protuberance, recess and combination thereof is adapted for working with at least one of said means of guidance.

9. The button of claim 8, in which an elastic means extends between the plate and the indicator to exert a force which tends to move the indicator away from the plate.

10. The button of claim 1, in which the cover has an internal face directed towards the chamber and an external face with at least three lateral recesses defining interlocking zones for at least fingers of a user's hand, and in which at least some aforesaid recesses defines guidance zones along the internal face for a face of the indicator during its rotation.

11. The button of claim 1, in which the cover has a front wall and a side wall fitted to grip on the support, in which the front wall has an internal face turned towards the chamber provided with a means of guidance fitted to work together with an element of a part of the indicator selected from the group consisting of a rod, a cavity and an orifice, in which the aforesaid element of a part of the indicator has a central axis corresponding to the axis of rotation of the plate, and in which the aforesaid means of guidance guides the part of the indicator during its rotation.

12. The button of claim 1, in which the plate has a side wall equipped with teeth, while the rotor comprises a part with at least one tooth fitted to work together with teeth of the plate in the open position of the rotor, with the aforesaid part of the rotor being fitted so as not to act on the plate in the closed position of the rotor so as to enable a relative rotation of the plate in relation to the fastening element.

13. The button of claim 1, in which the cover has at least one window for the indicator to indicate at least a first position for the button roughly corresponding to the minimum tightening torque for the fastening element and a second position for the button corresponding to a tightening torque lower than the tightening torque for the first position.

14. The button of claim 13, in which the cover has at least two windows.

15. The button of claim 1, in which the rotor is fitted immovably to the cover.

16. The button of claim 1, in which the support and the plate are fitted with suitable means to transform a rotation movement between the plate and the support into a translation movement of the plate between a first position for which a part supporting the fastening element is in contact with one face of the plate, and a second position for which the part supporting the fastening element is distanced from the plate in such a manner that a rotation of the plate does not engender rotation of the part supporting the fastening element.

17. The button of claim 16, in which the rotor has one end with teeth working together with the teeth of the plate so that a rotation of the rotor causes a rotation of the plate and thus its movement parallel to the axis of rotation.

18. A system for securing an object at least by the screwing of at least one fastening element adapted to be fastened by rotation in a first direction around an axis of rotation on a counter element attached to the object, said counter element being selected from the group comprising a counter nut with a central axis and a counter threaded rod with a longitudinal axis, said fastening element being adapted to be withdrawn from the said counter element by rotation in a second direction opposite to the first direction, whereby the rotation of the fastening element in the first direction fastens the fastening element onto the counter element, said counter element having an axis selected from the group comprising the longitudinal axis of the counter threaded rod and the central axis of the counter nut, in which the fastening element is selected from the group comprising:

when the counter element is the counter threaded rod, a fastening nut having a central axis and adapted to be fastened by rotation around said central axis onto the counter threaded rod, by exerting a tightening torque, said central axis of the fastening nut corresponding to the axis of rotation of the fastening nut onto the counter threaded rod, and when the counter element is the counter nut, a fastening threaded rod having a longitudinal axis and adapted to be fastened by rotation around said longitudinal axis of said fastening threaded rod onto the counter nut by exerting a tightening torque, said longitudinal axis of the fastening threaded rod corresponding to the axis of rotation of the fastening threaded rod onto the counter nut, the system comprising a button in which the fastening element is linked thereto, the button comprising:

a support having an opening either for a counter threaded rod as the counter element adapted to be fastened by rotation onto a fastening nut acting as the fastening element, or for a fastening threaded rod acting as the fastening element adapted to be fastened by rotation to a counter nut acting as the counter element, said support comprising a support element attached to the fastening nut or the fastening threaded rod, said support element being mounted rotatable with respect to the support around the aforesaid axis of rotation and having a surface provided with teeth, in which the support element with the fastening nut or the fastening threaded rod is fitted at least partly into the aforesaid opening of the support so as to be able to turn in rotation with respect to said support around the aforesaid axis of rotation;

a cover fitted onto the aforesaid support and defining a chamber with the aforesaid support, a plate linked to the aforesaid fastening element, in which the aforesaid plate has a face provided with teeth directed towards the teeth of said surface of the support element, in which the aforesaid plate is situated in the aforesaid chamber and is fitted to move in the aforesaid chamber between a first position in which the teeth of the said face of the aforesaid plate are working with the teeth of the said surface of the support element, so that a rotation of the plate drives into rotation the support element, and a second position in which the teeth of the face of the plate are away from the teeth of the surface of the support element, a locking mechanism comprising a rotor controlled by a key and moving between (a) an open position in which a link is formed between on the one hand the plate and, on the other hand, a piece selected from the group consisting of the cover and the support to enable at least the conversion of a rotation movement of the said piece into a rotation movement of the fastening element and the plate in relation to the corresponding counter element in the second direction of the aforesaid fastening element onto the aforesaid corresponding counter element, and (b) a closed position in which the rotation of the support or the cover does not drive the rotation of the fastening element fixed to the aforesaid corresponding counter element, at least when the tightening torque exerted by the fastening element onto the counter element is greater than a minimum tightening torque, and a means of connection between the aforesaid plate and the aforesaid support element, said means of connection controlling the position of the plate with respect to the support element, with the aforesaid means of connection being fitted at least (a) to ensure that a rotation of the support element and the plate in the first direction drives a rotation of the fastening element when the tightening torque exerted by the fastening element onto the counter element is perceptibly lower than the aforesaid minimum tightening torque, (b) to ensure, when the tightening torque exerted by the fastening element onto the counter element is at least equal to roughly the minimum tightening torque, that a rotation of the plate in the first direction does not involve a rotation of the support element, and (c) to ensure that in the closed position of the rotor of the locking mechanism, a rotation of the plate in the second direction does not drive in rotation of the support element, at least when the tightening torque exerted by for the fastening element onto the counter element is at least roughly equal to the aforesaid minimum tightening torque, in which the cover has at least one window for an indicator for at least one position selected from the group consisting of a first indicator position for indicating that the button is fastening the fastening element and a second indicator position for indicating that the locking mechanism has been activated to the closed position such that the button is not fastening the fastening element, and in which the indicator is connected to the plate by a means ensuring that a rotation of the plate is translated into a rotation of the indicator, and in which the cover comprises a means limiting the rotation of the indicator and thus of the plate.

19. The system of claim 18, in which the cover of the button comprises at least one interior wall forming a housing adapted to accommodate the rotor, in which the means for limiting the rotation of the indicator and thus of the plate is formed by a part of a wall selected from the group consisting of part of at least one wall forming the aforesaid housing, a part of the wall of the rotor, and combinations thereof.

20. The system of claim 18, in which the indicator of the button is connected to the plate by a means fitted to enable a translation movement parallel to the aforesaid axis of rotation between at least a part of the indicator and aforesaid plate, and in which a force exerting means extends between the aforesaid part of the indicator and the aforesaid plate to exert a force which tends to move the aforesaid part of the indicator away in relation to the aforesaid plate.

21. The system of claim 20, in which the cover of the button is attached to the support by connection systems comprising at least one lug joined to at least one piece selected from the group consisting of the cover and the support, said at least one lug being adapted to fit into at least one recess which the said piece selected from the group consisting of the cover and the support has, and in which the force exerting means, by exerting a force which tends to move the aforesaid part of the indicator away in relation to the aforesaid plate, is adapted to also exert a force which tends to increase the latching of the cover onto the support.

22. The system of claim 20, in which the plate of the button is fitted to move on the support so as to be able to move in parallel to the axis of rotation between a position where the plate is brought closer to the support element and a position where the plate is moved away from the support element.

23. The system of claim 18, in which the indicator of the button is connected to the plate by a means fitted to enable a translation movement parallel to the aforesaid axis of rotation between at least a part of the indicator and aforesaid plate, in which a force exerting means extend between the aforesaid part of the indicator and the aforesaid plate to exert a force which tends to move the aforesaid part of the indicator away in relation to the aforesaid plate, and in which the force exerting means is an elastic means.

24. The system of claim 18, in which the indicator of the button is connected to the plate by a means fitted to enable a translation movement parallel to the aforesaid axis of rotation between at least a part of the indicator and aforesaid plate, in which a force exerting means extend between the aforesaid part of the indicator and the aforesaid plate to exert a force which tends to move the aforesaid part of the indicator away in relation to the aforesaid plate, and in which the force exerting means is a spring.

25. The system of claim 18, in which the plate of the system supports an elongated element selected from the group consisting of a tube and a rod, said elongated element having at least one means of guidance, in which the indicator comprises a part capable of sliding relatively with respect to the elongated element supported by the plate, in which the said part of the indicator comprises at least one means selected from the group consisting of protuberance, recess or a combination thereof, and in which said at least one means selected from the group consisting of protuberance, recess and combination thereof is adapted for working with at least one of said means of guidance.

26. The system of claim 25, in which an elastic means extends between the plate and the indicator to exert a force which tends to move the indicator away from the plate.

27. The system of claim 18, in which the cover of the button has an internal face directed towards the chamber and an external face with at least three lateral recesses defining interlocking zones for at least fingers of a user's hand, and in which at least some aforesaid recesses defines guidance zones along the internal face for a face of the indicator during its rotation.

28. The system of claim 18, in which the cover of the plate has a front wall and a side wall fitted to grip on the support, in which the front wall has an internal face turned towards the chamber provided with a means of guidance fitted to work together with an element of a part of the indicator selected from the group consisting of a rod, a cavity and an orifice, in which the aforesaid element of a part of the indicator has a central axis corresponding to the axis of rotation of the plate, and in which the aforesaid means of guidance guides the part of the indicator during its rotation.

29. The system of claim 18, in which the plate of the support has a side wall equipped with teeth, while the rotor comprises a part with at least one tooth fitted to work together with teeth of the plate in the open position of the rotor, with the aforesaid part of the rotor being fitted so as not to act on the plate in the closed position of the rotor so as to enable a relative rotation of the plate in relation to the fastening element.

30. The system of claim 18, in which the cover of the button has at least one window for the indicator to indicate at least a first position for the button roughly corresponding to the minimum tightening torque for the fasting element and a second position for the button corresponding to a tightening torque lower than the tightening torque for the first position.

31. The system of claim 30, in which the cover of the button has at least two windows.

32. The system of claim 18, in which the rotor of the button is fitted immovably to the cover.

33. The system of claim 18, in which the support and the plate of the button are fitted with suitable means to transform a rotation movement between the plate and the support into a translation movement of the plate between a first position for which a part supporting the fastening element is in contact with one face of the plate, and a second position for which the part supporting the element is distanced from the plate in such a manner that a rotation of the plate does not engender rotation of the part supporting the fastening element.

34. The system of claim 33, in which the rotor of the button has one end with teeth working together with the teeth of the plate so that a rotation of the rotor causes a rotation of the plate and thus its movement parallel to the axis of rotation.

35. The system of claim 18, wherein the system is configured to secure a cycle, a ski, a luggage, and/or a wheel onto a rack, a gate, and/or a wheel support.

36. A button configured to be linked to a fastening element adapted to be fastened by rotation around an axis of rotation on a counter element selected from the group comprising a counter nut with a central axis and a counter threaded rod with a longitudinal axis, said fastening element being adapted to be withdrawn from the said counter element by rotation in a second direction opposite to the first direction, whereby the rotation of the fastening element in the first direction fastens the fastening element onto the counter element, said counter element having an axis selected from the group consisting of the longitudinal axis of the counter threaded rod and the central axis of the counter nut, in which the fastening element is selected from the group comprising:
when the counter element is the counter threaded rod, a fastening nut having a central axis and adapted to be fastened by rotation around said central axis of the fastening nut onto the counter threaded rod, by exerting a tightening torque, said central axis of the fastening nut corresponding to the axis of rotation of the fastening nut onto the counter threaded rod, and
when the counter element is the counter nut, a fastening threaded rod having a longitudinal axis and adapted to be fastened by rotation around said longitudinal axis of said fastening threaded rod onto the counter nut by exerting a tightening torque, said longitudinal axis of said fastening threaded rod corresponding to the axis of rotation of the fastening threaded rod onto the counter nut,
in which aforesaid button comprises:
a support having an opening either for a counter threaded rod adapted to be fastened by rotation onto a nut acting as the fastening element, or for a fastening threaded rod adapted to be fastened by rotation to a counter nut, said support comprising a support element attached to the fastening nut or the fastening threaded rod, said support element being mounted rotatable with respect to the support around the aforesaid axis of rotation and having a surface provided with teeth, in which the support element with the fastening nut or the fastening threaded rod is fitted at least partly into the aforesaid opening of the support so as to be able to turn in rotation with respect to said support around the aforesaid axis of rotation, said support element comprising a plate provided with teeth defining spaces therebetween;

a cover fitted onto the aforesaid support and defining a chamber with the aforesaid support, in which the aforesaid plate is situated in the aforesaid chamber and is fitted to move in the aforesaid chamber, a locking mechanism comprising a rotor controlled by a key and moving between (a) an open position in which a link is formed between on the one hand the plate and, on the other hand, a piece selected from the group consisting of the cover and the support to enable at least the conversion of a rotation movement of the said piece into a rotation movement of the fastening element in relation to the corresponding counter element in the second direction of the aforesaid fastening element to the aforesaid corresponding counter element, and (b) a closed position in which the rotation of the support or the cover does not drive the rotation of the fastening element fixed to the aforesaid corresponding counter element, at least when the tightening torque exerted by the fastening element onto the counter element is greater than a minimum tightening torque, and a means of connection between the aforesaid plate and the aforesaid rotor, with the aforesaid means of connection being fitted to move in relation to the piece selected from the group consisting of the cover, the support, and the combination thereof between a first position adjusted to ensure that a rotation of the piece ensures a rotation of the plate at least in the second direction, and a second position adjusted to ensure that a rotation of the support and the cover does not involve a rotation of the plate at least in the second direction, in which the rotor of the locking mechanism is fitted to control the movement of the means of connection between its first position and its second position and conversely, in which the cover has at least one window for an indicator for at least one position chosen from the first position of the means of connection and the second position of the means of connection, and in which the indicator is connected to the plate by a part attached to the means of connection.

37. A system for securing an object at least by the screwing of at least one fastening element adapted to be fastened by rotation around an axis of rotation on a counter element attached to the object, said counter element being selected from the group comprising a counter nut with a central axis and a counter threaded rod with a longitudinal axis, said fastening element being adapted to be withdrawn from the said counter element by rotation in a second direction opposite to the first direction, whereby the rotation of the fastening element in the first direction fastens the fastening element onto the counter element, said counter element having an axis selected from the group consisting of the longitudinal axis of the counter threaded rod and the central axis of the counter nut, in which the fastening element is selected from the group comprising:

when the counter element is the counter threaded rod, a fastening nut having a central axis and adapted to be fastened by rotation around said central axis of the fastening nut onto the counter threaded rod, by exerting a tightening torque, said central axis of the fastening nut corresponding to the axis of rotation of the fastening nut onto the counter threaded rod, and when the counter element is the counter nut, a fastening threaded rod having a longitudinal axis and adapted to be fastened by rotation around said longitudinal axis of said fastening threaded rod onto the counter nut by exerting a tightening torque, said longitudinal axis of said fastening threaded rod corresponding to the axis of rotation of the fastening threaded rod onto the counter nut, the system comprising a button in which at least the fastening element is linked thereto, the button comprising:

a support having an opening either for a counter threaded rod adapted to be fastened by rotation onto a fastening nut, or for a fastening threaded rod adapted to be fastened by rotation to a counter nut, said support comprising a support element attached to the fastening nut or the fastening threaded rod, said support element being mounted rotatable with respect to the support around the aforesaid axis of rotation and having a surface provided with teeth, in which the support element with the fastening nut or the fastening threaded rod is fitted at least partly into the aforesaid opening so as to be able to turn in rotation with respect to said support around the aforesaid axis of rotation, said support element comprising a plate provided with teeth defining spaces there between;

a cover fitted onto the aforesaid support and defining a chamber with the aforesaid support, in which the aforesaid plate is situated in the aforesaid chamber and is fitted to move in the aforesaid chamber, a locking mechanism comprising a rotor controlled by a key and moving between (a) an open position in which a link is formed between on the one hand the plate and, on the other hand, a piece selected from the group consisting of the cover and the support to enable at least the conversion of a rotation movement of the said piece into a rotation movement of the fastening element in relation to the corresponding counter element in the second direction of the aforesaid fasting element to the aforesaid corresponding counter element, and (b) a closed position in which the rotation of the support or the cover does not drive the rotation of the fastening element fixed to the aforesaid corresponding counter element, at least when the tightening torque exerted by the fastening element onto the counter element is greater than a minimum tightening torque, and a means of connection between the aforesaid plate and the aforesaid rotor, with the aforesaid means of connection being fitted to move in relation to the piece selected from the group consisting of the cover, the support and the combination thereof between a first position adjusted to ensure that a rotation of the piece ensures a rotation of the plate at least in the second direction, and a second position adjusted to ensure that a rotation of the support and the cover does not involve a rotation of the plate at least in the second direction, in which the rotor of the locking mechanism is fitted to control the movement of the means of connection between its first position and its second position and conversely, in which the cover has at least one window for an indicator for at least one position chosen from the first position of the means of connection and the second position of the means of connection, and in which the indicator is connected to the plate by a part attached to the means of connection.

* * * * *